US012665663B2

(12) United States Patent
Lee et al.

(10) Patent No.: US 12,665,663 B2
(45) Date of Patent: Jun. 23, 2026

(54) SATELLITE COMMUNICATION SYSTEM AND METHOD FOR MANAGING EMERGENCY MESSAGING SERVICES

(71) Applicant: Hughes Network Systems, LLC, Germantown, MD (US)

(72) Inventors: Lin-Nan Lee, Potomac, MD (US); Liping Chen, Bethesda, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 243 days.

(21) Appl. No.: 18/508,103

(22) Filed: Nov. 13, 2023

(65) Prior Publication Data

US 2025/0158704 A1 May 15, 2025

(51) Int. Cl.
 *H04B 7/185* (2006.01)
 *H04B 7/19* (2006.01)
(52) U.S. Cl.
 CPC ........... *H04B 7/18558* (2013.01); *H04B 7/19* (2013.01)
(58) Field of Classification Search
 CPC .. H04B 7/18558; H04B 7/19; H04B 7/18528; H04B 7/18532; H04B 7/18554; H04B 7/18515; G01S 19/396
 See application file for complete search history.

(56) References Cited

U.S. PATENT DOCUMENTS

2015/0146631 A1 5/2015 Kim et al.
2018/0316089 A1* 11/2018 Amaki .................... G01S 19/38

2018/0316416 A1* 11/2018 Reis ......................... H01Q 3/02
2024/0313853 A1* 9/2024 Kwon .................... H04W 4/026
2025/0132820 A1* 4/2025 Song .................. H04B 7/18519

OTHER PUBLICATIONS

European Patent Office, "International Search Report and Written Opinion for PCT Application No. PCT/US2024/054406", mailed Feb. 4, 2025, 13 pages.
Hofmann, et al., "Direct Access to GEO Satellites: An Internet of Remote Things Technology", 2019 IEEE 2nd 5G World Forum, Sep. 30, 2019, pp. 578-583.
Hofmann, et al., "Tracking of Remote IoT Devices by Satellite Assisted Geolocation", ICC 2020—2020 IEEE International Conference on Communications, Jun. 7, 2020, pp. 1-6.

* cited by examiner

*Primary Examiner* — Kenneth T Lam
(74) *Attorney, Agent, or Firm* — Mannava & Kang, P.C.

(57) ABSTRACT

A system and method for managing emergency messaging services is disclosed. The system receives request for transmitting emergency message from user equipment (UE) to geosynchronous equatorial orbit (GEO) satellite. Further, the system determines current location information of the UE. The system determines satellite location of the GEO satellite in proximity to the UE. The system computes a threshold azimuth angle between the UE and the GEO satellite. Further, the system determines an azimuth angle of the UE. Furthermore, the system determines a deviation level between the computed threshold azimuth angle and the determined azimuth angle of the UE. The system further generates an alignment recommendation message for the UE at real-time. Furthermore, the system validates the alignment recommendation message based on signal strength, and signal quality of the UE. Additionally, the system initiates transmission of the emergency message from UE to GEO satellite.

20 Claims, 15 Drawing Sheets

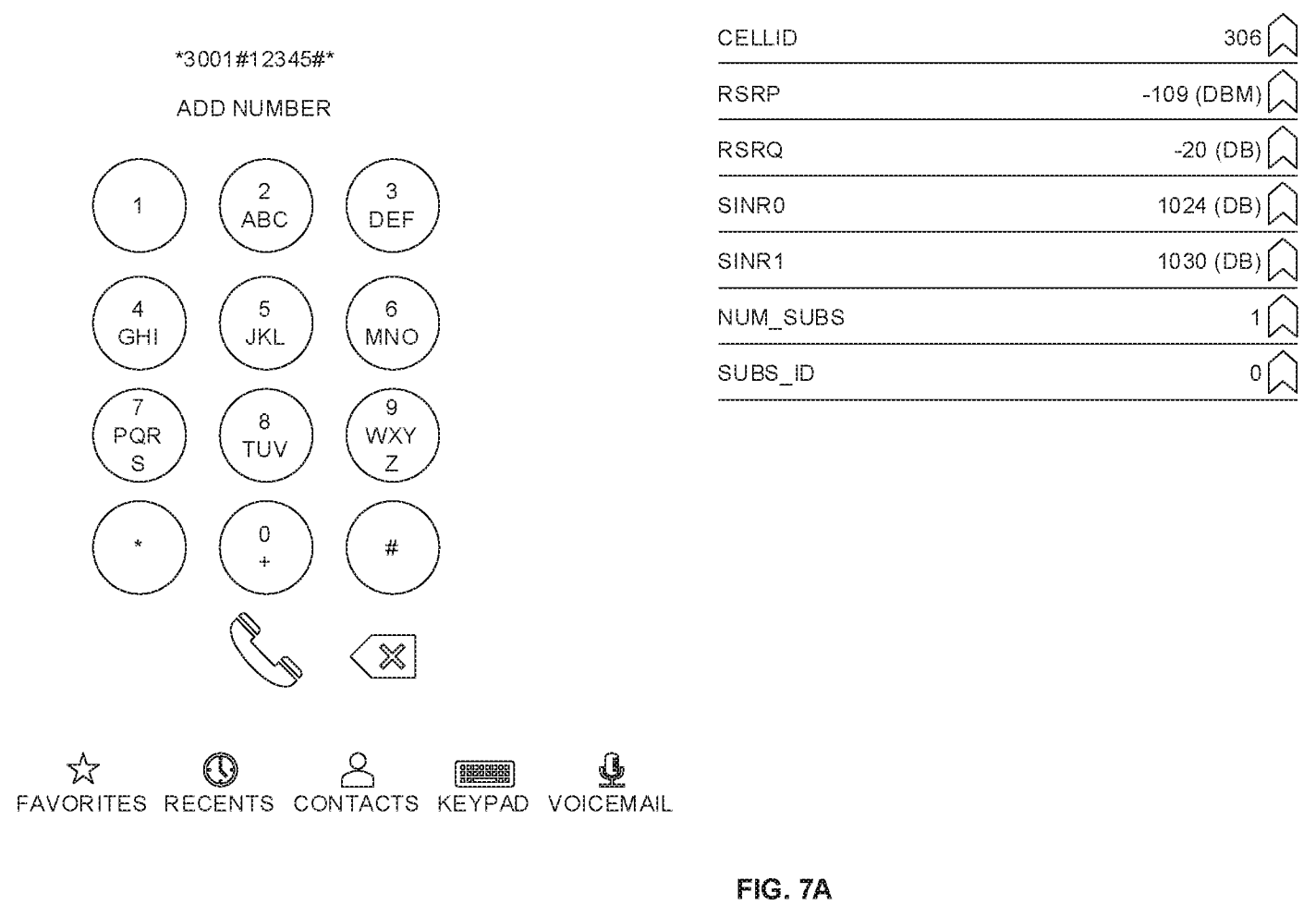

| | |
|---|---|
| CELLID | 306 |
| RSRP | -109 (DBM) |
| RSRQ | -20 (DB) |
| SINR0 | 1024 (DB) |
| SINR1 | 1030 (DB) |
| NUM_SUBS | 1 |
| SUBS_ID | 0 |

FIG. 7A

*3001#12345#*
ADD NUMBER

| 1 | 2 ABC | 3 DEF |
|---|---|---|
| 4 GHI | 5 JKL | 6 MNO |
| 7 PQRS | 8 TUV | 9 WXYZ |
| * | 0 + | # |

FAVORITES  RECENTS  CONTACTS  KEYPAD  VOICEMAIL

| RSRP | Signal Strength | Description |
|---|---|---|
| >=-80dBm | Excellent | Strong signal with maximum data speeds |
| 80dBm to -90dBm | Good | Strong signal with good data speeds |
| 90dBm to -100dBm | Fair to poor | Reliable data speeds may be attained, but marginal data with drop-outs is possible. When this value gets close to -100, performance will drop drastically |
| <=-100dBm | No signal | Disconnection |

| RSRQ | Signal Quality | Description |
|---|---|---|
| >=-10dBm | Excellent | Strong Signal with maximum data speeds |
| 10dB to -15dB | Good | Strong Signal with good data speeds |
| 15dB to -20dB | Fair to poor | Reliable data speeds maybe attained, but marginal data with drop-outs is possible. When this value gets close to -20, performance will drop drastically |
| <=-20dB | No signal | Disconnection |

FIG. 7B

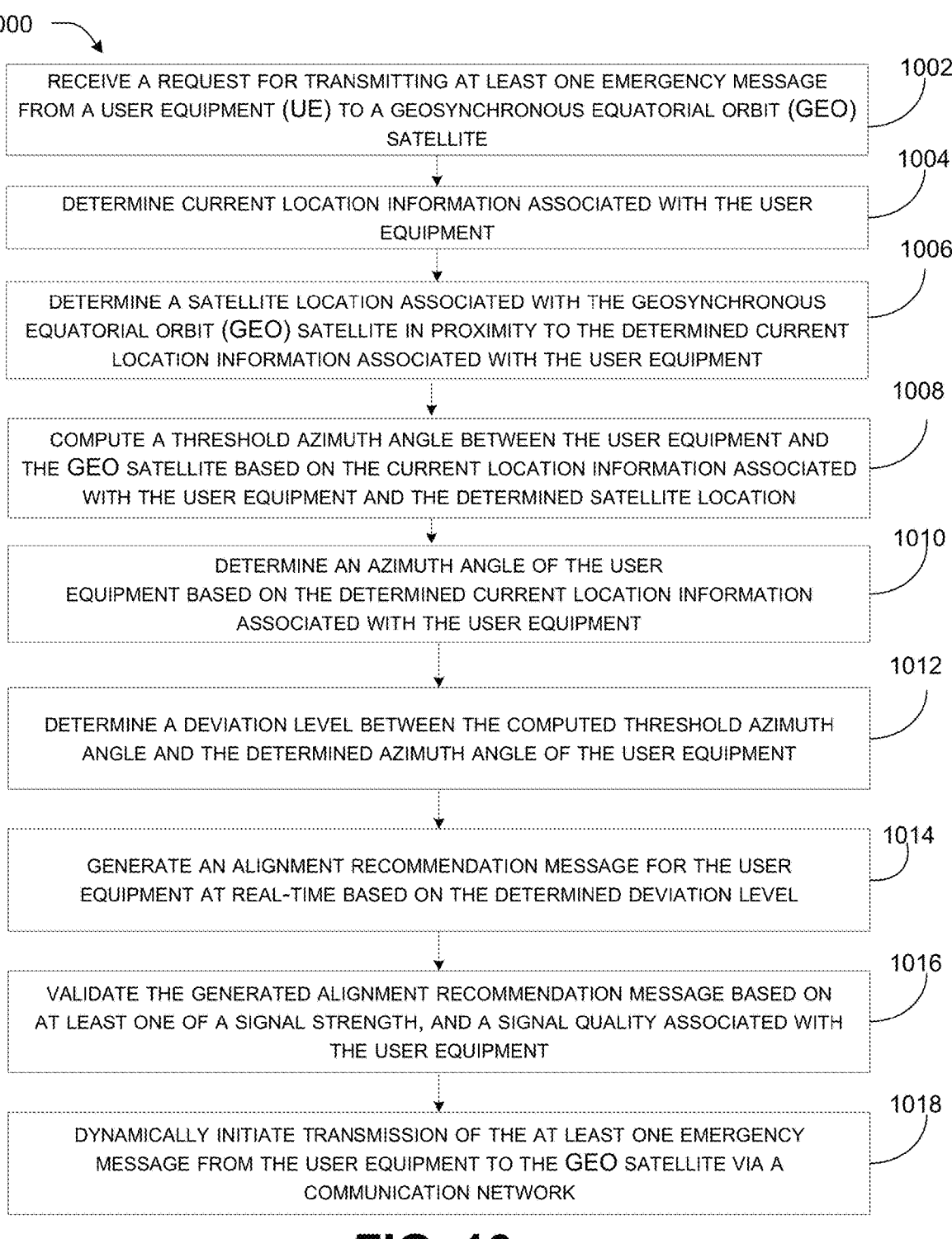

1000

RECEIVE A REQUEST FOR TRANSMITTING AT LEAST ONE EMERGENCY MESSAGE FROM A USER EQUIPMENT (UE) TO A GEOSYNCHRONOUS EQUATORIAL ORBIT (GEO) SATELLITE — 1002

DETERMINE CURRENT LOCATION INFORMATION ASSOCIATED WITH THE USER EQUIPMENT — 1004

DETERMINE A SATELLITE LOCATION ASSOCIATED WITH THE GEOSYNCHRONOUS EQUATORIAL ORBIT (GEO) SATELLITE IN PROXIMITY TO THE DETERMINED CURRENT LOCATION INFORMATION ASSOCIATED WITH THE USER EQUIPMENT — 1006

COMPUTE A THRESHOLD AZIMUTH ANGLE BETWEEN THE USER EQUIPMENT AND THE GEO SATELLITE BASED ON THE CURRENT LOCATION INFORMATION ASSOCIATED WITH THE USER EQUIPMENT AND THE DETERMINED SATELLITE LOCATION — 1008

DETERMINE AN AZIMUTH ANGLE OF THE USER EQUIPMENT BASED ON THE DETERMINED CURRENT LOCATION INFORMATION ASSOCIATED WITH THE USER EQUIPMENT — 1010

DETERMINE A DEVIATION LEVEL BETWEEN THE COMPUTED THRESHOLD AZIMUTH ANGLE AND THE DETERMINED AZIMUTH ANGLE OF THE USER EQUIPMENT — 1012

GENERATE AN ALIGNMENT RECOMMENDATION MESSAGE FOR THE USER EQUIPMENT AT REAL-TIME BASED ON THE DETERMINED DEVIATION LEVEL — 1014

VALIDATE THE GENERATED ALIGNMENT RECOMMENDATION MESSAGE BASED ON AT LEAST ONE OF A SIGNAL STRENGTH, AND A SIGNAL QUALITY ASSOCIATED WITH THE USER EQUIPMENT — 1016

DYNAMICALLY INITIATE TRANSMISSION OF THE AT LEAST ONE EMERGENCY MESSAGE FROM THE USER EQUIPMENT TO THE GEO SATELLITE VIA A COMMUNICATION NETWORK — 1018

FIG. 10

SATELLITE COMMUNICATION SYSTEM AND METHOD FOR MANAGING EMERGENCY MESSAGING SERVICES

TECHNICAL FIELD

This patent application is directed to communication systems and, more specifically, to satellite communication systems and methods for managing emergency messaging services.

BACKGROUND

Satellite communication systems play an important role in facilitating efficient and reliable emergency messaging services for users of cellular terminal. The emergency messaging services allows the users of cellular terminal to establish a communication with satellites for transmitting high-priority messages to the satellites during emergency situations. However, the communication established with the satellites may frequently be challenging when the users of the cellular terminal are in areas lacking adequate cellular coverage. While current solutions addresses the cellular coverage concern, they may often present significant usability challenges for the users of the cellular terminal during the emergency situations.

Solutions relying on Low Earth Orbit (LEO) satellites for providing emergency messaging services has been employed. LEO satellite networks operating within a S-band (or L-band) cover extensive service areas but at times may be at a very low elevation angles. However, depending on the user terminal location, the operation of the S-band (or L-band) at very low-elevation angles may be susceptible to signal blockage by terrain features, which in turn leading to unreliable, intermittent, or simply complete loss of communication. Additionally, LEO satellites typically traverse locations at a very high velocities, which may complicate the ability of the users of the cellular terminal to establish a clear line of sight with the LEO satellites in emergency scenarios.

Positioning of the LEO satellites at distances ranging from approximately 500 km to 1400 km above the Earth, comparing to the Geosynchronous satellites which is located at about 38,000 km above the Earth, may result in a disparity in slant range. This may lead to a pathloss advantage of approximately 25.5 dB at a 20-degree elevation angle from the user perspective However, variations in antenna size may lead to significant variation in Gain/Temperature (G/T) received by the satellite. For example, Geostationary Earth Orbit (GEO) satellites may demonstrate a G/T of, for example, 20.0 dB/K, while the LEO satellites may exhibit a G/T of for example, 3.5 dB/K. This may result in a considerable loss in LEO satellites compared to the GEO satellites. Additionally, without instantaneous direction of the LEO satellite, an uplink signal may pass through body of the users, resulting in an additional 3-4 dB of loss. With larger antenna on the GEO satellite, if the body loss can be avoided, connection to the GEO can be comparable to a connection to a LEO with the body loss. Because the LEO satellite moves quickly, its connection may be less reliable and accessible during emergency situations.

Consequently, there may be a need in the art for a system and method to enhance the efficiency and reliability of emergency messaging services provided by satellite communication systems, specifically in areas lacking cellular coverage, to address at least the aforementioned issues.

SUMMARY

This summary is provided to introduce a selection of concepts, in a simple manner, which is further described in the detailed description of the disclosure. This summary is neither intended to identify essential inventive concepts of the subject matter nor to determine the scope of the disclosure.

An aspect of the present disclosure provides a satellite communication system for managing emergency messaging services. The system receives a request for transmitting at least one emergency message from a user equipment (UE) to a geosynchronous equatorial orbit (GEO) satellite. Further, the system determines current location information associated with the user equipment. The current location information includes latitude coordinates, longitude coordinates, and a heading information. Further, the system determines a satellite location associated with the geosynchronous equatorial orbit (GEO) satellite in proximity to the determined current location information associated with the user equipment. Furthermore, the system computes a threshold azimuth angle between the user equipment and the GEO satellite based on the current location information associated with the user equipment and the determined satellite location.

Additionally, the system determines an azimuth angle of the user equipment based on the determined current location information associated with the user equipment. Furthermore, the system determines a deviation level between the computed threshold azimuth angle and the determined azimuth angle of the user equipment. The system further generates an alignment recommendation message for the user equipment at real-time based on the determined deviation level. The generated alignment recommendation message comprises at least one action for navigating the user equipment to a specific location and facing a specific angle. Furthermore, the system validates the generated alignment recommendation message based on at least one of a signal strength, and a signal quality associated with the user equipment. Additionally, the system dynamically initiates transmission of the at least one emergency message from the user equipment to the GEO satellite via a communication network.

Another aspect of the present disclosure provides a satellite communication method for accessing emergency messaging services. The method includes receiving a request for transmitting at least one emergency message from a user equipment (UE) to a geosynchronous equatorial orbit (GEO) satellite. Further, the method includes determining current location information associated with the user equipment. The current location information includes latitude coordinates, longitude coordinates, and a heading information. Furthermore, the method includes determining a satellite location associated with the geosynchronous equatorial orbit (GEO) satellite with respect to the determined current location information associated with the user equipment. Additionally, the method includes computing a threshold azimuth angle between the user equipment and the GEO satellite based on the current location information associated with the user equipment and the determined GEO satellite location. Furthermore, the method includes determining an azimuth angle of the user equipment based on the determined current location information associated with the user equipment.

Further, the method includes determining a deviation level between the computed threshold azimuth angle and the determined azimuth angle of the user equipment. The method further includes generating an alignment recommendation message for the user equipment at real-time based on the determined deviation level. The generated alignment recommendation message includes at least one action for navigating the user equipment to a specific location and specific angle based on the determined azimuth angle. Furthermore, the method includes validating the generated alignment recommendation message based on at least one of a signal strength, and a signal quality associated with the user equipment. Additionally, the method includes dynamically initiating transmission of the at least one emergency message from the user equipment to the GEO satellite via a communication network.

Yet another aspect of the present disclosure provides a non-transitory computer-readable medium comprising machine-readable instructions that are executable by a processor. The processor receives a request for transmitting at least one emergency message from a user equipment (UE) to a geosynchronous equatorial orbit (GEO) satellite. Further, the processor determines current location information associated with the user equipment. The current location information includes latitude coordinates, longitude coordinates, and a heading information. Furthermore, the processor determines a satellite location associated with the geosynchronous equatorial orbit (GEO) satellite in proximity to the determined current location information associated with the user equipment. Additionally, the processor computes a threshold azimuth angle between the user equipment and the GEO satellite based on the current location information associated with the user equipment and the determined GEO satellite location. The processor further determines an azimuth angle of the user equipment based on the determined current location information associated with the user equipment. The processor further determines a deviation level between the computed threshold azimuth angle and the determined azimuth angle of the user equipment. Furthermore, the processor generates an alignment recommendation message for the user equipment at real-time based on the determined deviation level. The generated alignment recommendation message incudes at least one action for navigating the user equipment to a specific location and specific angle based on the determined azimuth angle. Further, the processor validates the generated alignment recommendation message based on at least one of a signal strength, and a signal quality associated with the user equipment. Additionally, the processor dynamically initiates transmission of the at least one emergency message from the user equipment to the GEO satellite via a communication network.

To further clarify the features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

Features of the disclosed embodiments are illustrated by way of example and not limited in the following Figure(s), in which like numerals indicate like elements, in which:

FIG. 7A illustrates an example to access signal power and quality of a certain user equipment, according to an example.

FIG. 7B illustrates an example tabular representation depicting signal strength level and signal quality level of the user equipment, according to an example.

FIG. 10 illustrates an example flow diagram representation of a method for managing emergency messaging services, according to an example.

Figure 1:
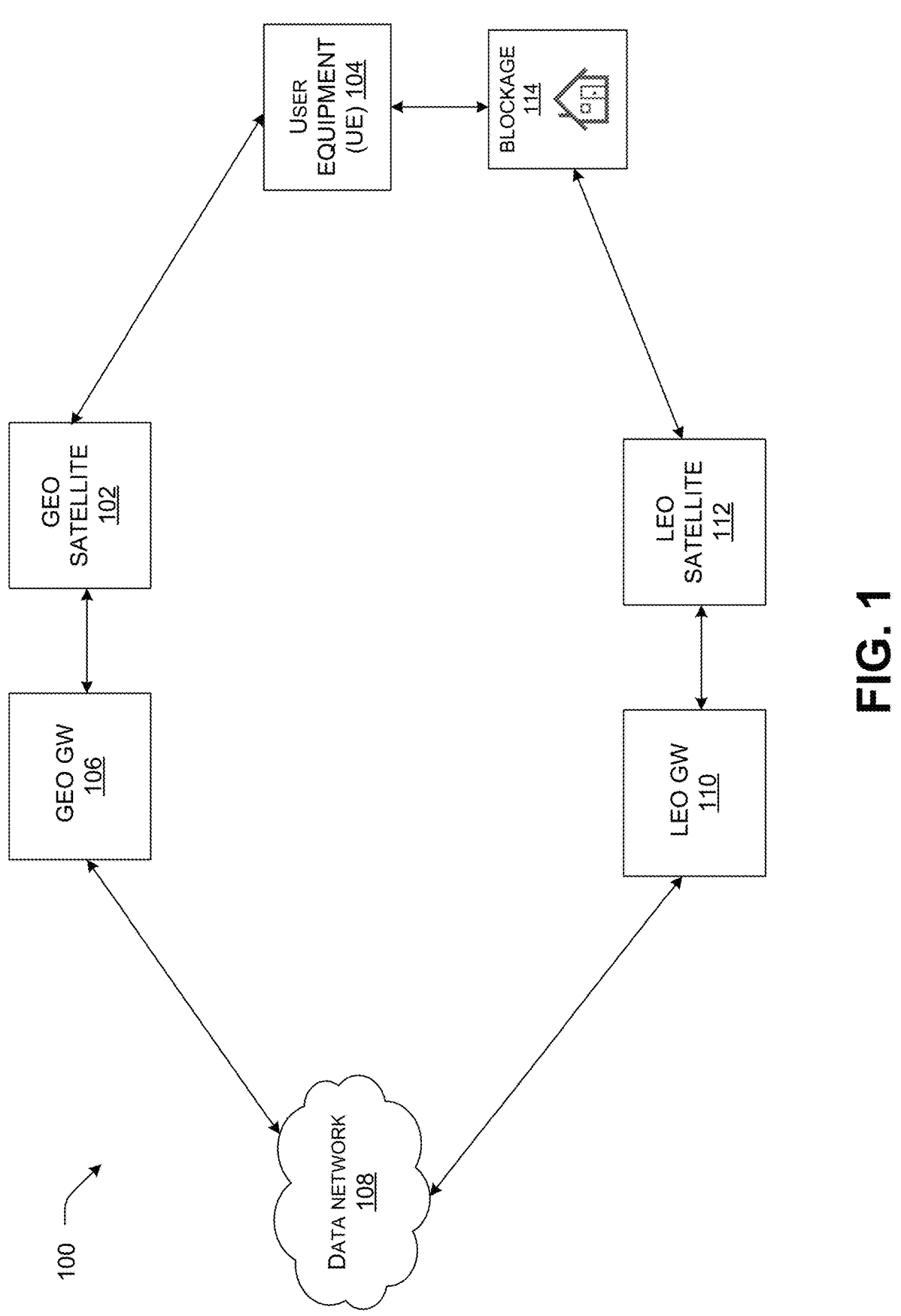
FIG. 1 illustrates an example block diagram representation of a satellite communication network capable of managing emergency messaging services, according to an example.

Further, those skilled in the art will appreciate those elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration". Any embodiment or implementation of the present subject matter described herein as "exemplary" is not necessarily to be construed as preferred or advantageous over other embodiments. The terms "comprise", "comprising", or any other variations thereof, are intended to cover a non-exclusive inclusion, such that one or more devices or subsystems or elements or structures or components preceded by "comprises . . . a" does not, without more constraints, preclude the existence of other devices, sub-systems, additional sub-modules. Appearances of the phrase "in an embodiment", "in another embodiment", "in an exemplary embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. A computer system (standalone, client, server, or computer-implemented system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations. Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Examples of the present disclosure provides a system and method for managing emergency messaging services. The system receives a request for transmitting at least one emergency message from a user equipment (UE) to a geosynchronous equatorial orbit (GEO) satellite. Further, the system determines current location information associated with the user equipment. The current location information includes latitude coordinates, longitude coordinates, and a heading information. The system determines a satellite location associated with the geosynchronous equatorial orbit (GEO) satellite in proximity to the determined current location information associated with the user equipment. Further, the system computes a threshold azimuth angle between the user equipment and the GEO satellite based on the current location information associated with the user equipment and the determined satellite location.

Additionally, the system determines an azimuth angle of the user equipment based on the determined current location information associated with the user equipment. Furthermore, the system determines a deviation level between the computed threshold azimuth angle and the determined azimuth angle of the user equipment. The system further generates an alignment recommendation message for the user equipment at real-time based on the determined deviation level of the user equipment. The generated alignment recommendation message comprises at least one action for navigating the user equipment to a specific location and a specific angle. Furthermore, the system validates the generated alignment recommendation message based on at least one of a signal strength, and a signal quality associated with the user equipment. Additionally, the system dynamically initiates transmission of the at least one emergency message from the user equipment to the GEO satellite via a communication network.

Referring now to the drawings, and more particularly to FIG. 1 through FIG. 10, where similar reference characters denote corresponding features consistently throughout the figures, there are shown preferred embodiments and these embodiments are described in the context of the following example system and/or method.

FIG. 1 illustrates an example block diagram representation of a satellite communication network 100 capable of managing emergency messaging services, according to an example. In some examples, the satellite communication network 100 may depict a wireless/satellite communication system capable of providing emergency messaging services. In some examples, the wireless/satellite communication system may be a third-generation partnership project (3GPP) standard-based terrestrial system, and non-terrestrial systems such as, but are not limited to, low earth orbiting (LEO) satellites, medium earth orbiting (MEO) satellites, geosynchronous earth orbiting (GEO) satellites, and/or other satellite types, and the like. In an example, the satellite communication network 100 may include a GEO satellite 102 (interchangeably herein after referred to as the satellite 102), a GEO gateway (GW) 104, a user equipment (UE) 104, a LEO gateway (GW) 110, a LEO satellite 112 and a blockage 114. The satellite 102 may be communicatively connected to a ground station antenna and a hub. Further, each of the GEO GW 106 and the LEO GW 110 may be further connected to a data network 108.

The User Equipment 104 and the electronic device may include, but is not limited to, a smartphone, a mobile phone, a personal digital assistant, a tablet computer, a tablet computer, a wearable device, a computer, a laptop computer, an augmented/virtual reality device (A/VR), internet of things (IoT) device, a camera, any other device, and the combination thereof. In an example, the UE 104 may have a multi-transport access capability.

In an example, a blockage 114 may be in proximity to the UE 104. The blockage 114 may be any obstacle, such as, for example, a building, an object or a tree or any other article that blocks signals emanating from UE 104 and signals destined to UE 104.

Further, the GEO satellite 102 may be an object intentionally placed into orbit. In some examples, the satellite 102 may be an artificial satellite that may be configured to transmit and receive data signals. For example, the satellite 102 may form one or more beams (e.g., spot beams) and provide connectivity to the user equipment 104. More specifically, the satellite 102 may communicate data signals using the one or more beams with the terminals via a terminal return channel and a terminal forward channel, and with the gateway 106 via a gateway return channel and a gateway forward channel (not shown). It should be appreciated that the satellite 102 may form any number of beams to communicate data signals with any number of components, even beyond the terminals or the gateway 106.

In some examples, the satellite 102 may include, but is not limited to, a transponder satellite, a regenerative satellite, and/or other similar satellite, and the like. Furthermore, in some examples, the satellite 102 may operate in geosynchronous orbit configuration.

While the processors, components, elements, systems, subsystems, and/or other computing devices may be shown as single components or elements, one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the satellite communication network 100, and components, as shown in FIG. 1.

In one example embodiment, the UE 104 may include one or more applications (not shown in FIG. 1). The applications may include, but is not limited to, hypertext transfer protocol (HTTP) components, web application frameworks, content management systems (CMS), server-side scripting languages, authentication and authorization modules, web services, application programming interfaces (APIs), caching and load balancing mechanisms, e-commerce applications, social media platforms, over-the-top (OTT) applications, any other applications, and a combination thereof.

In an example embodiment, the UE 104 may include a processor (not shown in FIG. 1) and a memory (not shown in FIG. 1) operatively coupled with the processor. The memory includes processor-executable instructions in the form of the plurality of modules. The processor executes the plurality of modules to perform a plurality of steps described below.

In an example embodiment, the plurality of modules associated with the UE 104 may receive a request for transmitting at least one emergency message to a geosynchronous equatorial orbit (GEO) satellite 102. Further, the UE 104 may determine current location information associated with the UE 104. The current location information may include latitude coordinates, longitude coordinates, and a heading information. The heading information may include a current orientation of the user equipment 104 relative to a magnetic north. The UE 104 may further determine a satellite location associated with the geosynchronous equatorial orbit (GEO) satellite 102 in proximity to the determined current location information associated with the user equipment 104. The proximity of the GEO satellite 102 to the UE 104 may be determined by when the satellite 102 is positioned relatively close to the user's location. In an example embodiment, for determining the satellite location associated with the GEO satellite 102 in proximity to the determined current location information associated with the UE 104, the UE 104 may determine the GEO satellite 102 in proximity to the determined current location information associated with the UE 104. Further, the UE 104 may determine the latitude coordinates and the longitude coordinates of the determined GEO satellite 102 using a pre-stored satellite library. In an example, the Geo satellite 102 is located on a GEO arc, which is a belt above the equator. The GEO satellite 102 location is specified by a longitude degree.

In an example, if the UE 104 is within the coverage footprint of a GEO satellite 102, the GEO satellite 102 may be referred to as being in proximity with current location information associated with the user equipment 104. The UE 104 may then establish a communication session with the GEO satellite 102. This allows the UE 104 to send and receive data, such as emergency messages, voice calls, text messages, or internet data, via the GEO satellite 102. The UE 104 may include an antenna (not shown in FIG. 1) pointed towards the GEO satellite 102 to establish and maintain this communication link. The UE 104 may then compute a threshold azimuth angle between the user equipment 104 and the GEO satellite 102 based on the current location information associated with the user equipment 104 and the determined location information associated with the GEO satellite 102. The threshold azimuth angle may include the input parameters such as the user locations in latitude and longitude, GEO satellite location in latitude and longitude. In an example, for computing the threshold azimuth angle between the UE 104 and the GEO satellite 102 based on the current location information associated with the UE 104 and the determined GEO satellite location, the UE 104 may determine the latitude coordinates and the longitude coordinates of the UE 104 from the prestored location library. In one example embodiment, the latitude coordinates, and the longitude coordinates of the UE 104 may be determined, by the UE 104, using a Global Positioning System (GPS) or any similar geolocation system of the UE 104. Further, the UE 104 may determine longitude coordinates of the GEO satellite 102 in proximity to the determined current location information associated with the UE 104. Further, the UE 104 may compute a variable 'a' based on the determined longitude coordinates of the GEO satellite 102, and the determined latitude coordinates and the longitude coordinates of the UE 104. Furthermore, the UE 104 may determine the azimuth angle '$AZ_{ue}$' of the UE 104 based on a difference between the computed variable difference and 180° angle in a specific direction. The UE 104 may further determine a satellite height 'h' of the GEO satellite 102 based on a prestored satellite library. Additionally, the UE 104 may determine a radius '$R_0$' of the Earth based on the prestored satellite library. Further, the UE 104 may determine the elevation angle '$El_{ue}$' of the UE 104 based on the determined satellite height 'h', the radius '$R_0$' of the Earth, the longitude coordinates of the GEO satellite 102, and the latitude coordinates and the longitude coordinates of the UE 104. A detailed explanation of this has been provided in FIG. 4.

In an example, the UE 104 may determine an azimuth angle of the user equipment 104 based on the determined current location information associated with the UE 104. In an example embodiment, for determining the azimuth angle of the UE 104, the UE 104 may determine heading information associated with the UE 104 using a pre-stored location library. Further, the UE 104 may determine the azimuth angle of the user equipment 104 based on the determined heading information.

In an example, the UE 104 may determine a deviation level between the computed threshold azimuth angle and the determined azimuth angle of the UE 104. In an example, for determining the deviation level between the computed threshold azimuth angle and the determined azimuth angle of the UE 104, the UE 104 may map the computed threshold azimuth angle with the determined azimuth angle of the user equipment 104. Further, the UE 104 may determine a difference between the computed threshold azimuth angle with the determined azimuth angle based on the mapping. The UE 104 may further determine the deviation level between the computed threshold azimuth angle and the determined azimuth angle of the user equipment 104 based on the determined difference.

In an example, the UE 104 may generate an alignment recommendation message for the UE 104 at real-time based on the determined deviation level of the UE 104. The generated alignment recommendation message may include at least one action for navigating the user equipment to a specific location blockage free and face to a specific angle and the like. In an example, for generating the alignment recommendation message for the UE 104, at real-time, based on the determined deviation level, the UE 104 may determine a target direction of the UE 104. The target direction of the UE 104 is determined based on the determined deviation level of the UE 104. Further, the UE 104 may generate a navigation path between the current location of the UE 104 and the determined target direction of the UE 104. Also, the UE 104 may generate the alignment recommendation message for the UE 104, at real-time, based on the generated navigation path. The alignment recommendation message may include, but is not limited to, instruction to adjust a position and an angle of the UE 104 closer to the computed threshold azimuth angle, and the like. In one example embodiment, the instructions to user may include "move to a location without blockage", "face the satellite align the bearing/direction with the satellite AZ angle", and the like.

In an example, the antenna of the user equipment 104 typically has a broad beamwidth in elevation direction. The Azimuth angle for the satellite 102 is calculated such that there is blockage 114, including the head or body of the user in the path. The user equipment 104 may provide the heading of its antenna, and the difference between the heading and the azimuth angle of the satellite 102 may be computed. The user equipment 104 may also include a compass application that may be used to compute the difference between azimuth angle of the satellite 102 and the antenna. The beamwidth of the user equipment 104 may be broad as well. The UE 104 may calculate the azimuth direction of the satellite 102 and position the user's head and body to avoid any potential blockage 114 along the general direction.

Additionally, the UE 104 may validate the generated alignment recommendation message based on at least one of a signal strength, and a signal quality associated with the user equipment 104. In an embodiment, for validating the generated alignment recommendation message based on at least one of the signal strength, and the signal quality associated with the UE 104, the UE 104 may determine a satellite downlink reference signal received power (RSRP) value associated with the UE 104 using a pre-stored signal library. Further, the UE 104 may determine a signal strength level of the user equipment 104 based on the determined satellite downlink RSRP value. Furthermore, the UE 104 may determine a reference signal received quality (RSRQ) value associated with the UE 104 using the pre-stored signal library. Furthermore, the UE 104 may determine a signal quality level of the UE 104 based on the determined RSRQ value. Further, the UE 104 may compare each of the determined signal strength level, and the signal quality level, of the UE 104 with corresponding threshold signal strength level, and a threshold signal quality level, of the UE 104. The UE 104 may validate the generated alignment recommendation message based on results of the comparison. In an example embodiment, the transmission of the emergency messages may be initiated upon determining that the determined signal strength level, and the signal quality level, of the UE 104 matches with the corresponding threshold signal strength level, and the threshold signal quality level, of the UE 104.

Additionally, the UE 104 may dynamically initiate transmission of the at least one emergency message from the user equipment 104 to the GEO satellite 102 via a communication network.

The UE 104 may further modify the alignment recommendation message based on at least one of the signal strength, and the signal quality, associated with the UE 104. In an example, if the results of the validation indicate a poor signal strength and a poor signal quality for the UE 104, then the UE 104 may update the alignment recommendation message to change position of the UE 104 or alignment of the UE 104 with respect to the GEO satellite 102. In an example, where the results of validation indicate a strong signal strength and strong signal quality for the UE 104, then the UE 104 updates the alignment recommendation message. The alignment recommendation message is updated to instruct the user to stand still in the same position and alignment with respect to the GEO satellite 102.

In an example, the UE 104 may transmit the emergency messages to the GEO satellite 102 via the communication network.

It should be appreciated that the satellite communication network 100 and the system(s) depicted in FIG. 1 may be a few example implementations. Hence, the satellite communication network 100 may or may not include additional features and some of the features described herein may be removed and/or modified without departing from the scope of the satellite communication network 100 outlined herein.

Figure 2:
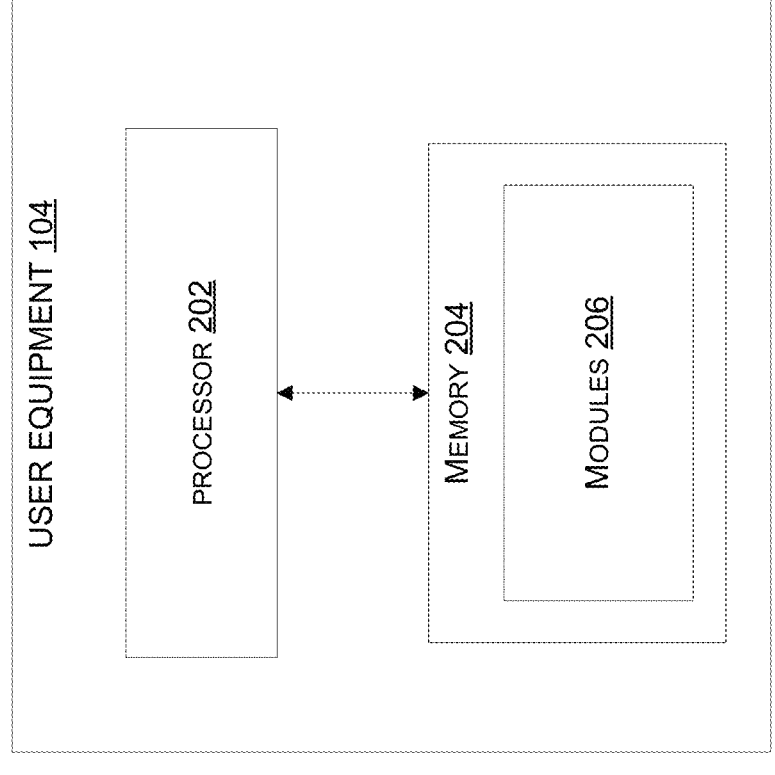
FIG. 2 illustrates an example block diagram representation of a user terminal, such as those shown in FIG. 1, capable of managing emergency messaging services, according to an example.

FIG. 2 illustrates an example block diagram representation of the user equipment 104, such as those shown in FIG. 1, capable of managing emergency messaging services, according to an example.

The UE 104 may include a processor 202, and a memory 204. The memory 204 may include processor-executable instructions, which on execution, cause the processor 202 to perform one or more operations described herein. The memory 204 may include a plurality of modules 206. The plurality modules 206 may include, but are not limited to, a receiving module, a location determination module, an azimuth angle computation module, an alignment recommendation module, a validation module, an emergency message handling module, a transmission module (not shown in FIGs.) and/or other modules. Each of these modules when executed by the processor 202 perform one or more functionalities described in the context of the UE 104. Execution of the machine-readable program instructions by the processor 202 may enable the UE 104 to perform one or more functions. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 202 may include, for example, microprocessors, microcomputers, microcontrollers, digital signal processors, central processing units, state machines, logic circuits, and/or any devices that manipulate data or signals based on operational instructions.

Among other capabilities, the processor 202 may fetch and execute computer-readable instructions from a memory (not shown) operationally coupled with UE 104 for performing tasks such as data processing, input/output processing, attributes extraction, and/or any other functions. Any reference to a task in the present disclosure may refer to an operation being, or that may be, performed on data or input information.

For example, the processor 202 may execute the receiving module to receive a request for transmitting at least one emergency message from the UE 104 to the GEO satellite 102. The emergency message may start with a channel allocation request in TA random access channel (RACH), and expect to establish a channel capacity assignment into which the emergency message is sent. Alternatively, very short messages may be send directly via the RACH channel.

Additionally, the processor 202 may execute the location determination module to determine current location information associated with the user equipment 104. The current location information may include latitude coordinates, longitude coordinates, and a heading information. The heading information may include a current orientation of the UE 104 relative to a magnetic north. Further, the processor 202 may execute the location determination module to determine a satellite location associated with the GEO satellite 102 in proximity to the determined current location information associated with the UE 104.

In an example, the processor 202 may execute the azimuth angle computation module to compute a threshold azimuth angle between the user equipment 104 and the GEO satellite 102 based on the current location information associated with the user equipment 104 and location information associated with the GEO satellite 102. Further, the processor 202 may execute the azimuth angle computation module to determine an azimuth angle of the UE 104 based on the determined current location information associated with the UE 104. Further, the processor 202 may execute the azimuth angle computation module to determine a deviation level between the computed threshold azimuth angle and the determined azimuth angle of the user equipment 104.

In an example, the processor 202 may execute the alignment recommendation module to generate an alignment recommendation message for the UE 104, at real-time, based on the determined deviation level. The generated alignment recommendation message may include at least one action for navigating the user equipment 104 to a specific location and a specific angle.

In an example, the processor 202 may execute the validation module to validate the generated alignment recommendation message based on at least one of a signal strength, and a signal quality associated with the UE 104.

In an example, the processor 202 may execute the emergency message handling module to dynamically initiate transmission of the at least one emergency message from the UE 104 to the GEO satellite 102 via a communication network. Further, the processor 202 may execute the emergency message handling module to modify the alignment recommendation message based on at least one of the signal strength, and the signal quality, associated with the UE 104.

The interconnect terminal (not shown in FIG. 2) may interconnect various subsystems, elements, and/or components of the UE 104. Further, the interconnect may be an abstraction that may represent any one or more separate physical buses, point-to-point connections, or both, connected by appropriate bridges, adapters, or controllers. In some examples, the interconnect may include a system bus, a peripheral component interconnect (PCI) bus, or PCIexpress (PCIe) bus, a hyper transport (HT) or industry standard architecture (ISA)) bus, a small computer system interface (SCSI) bus, a universal serial bus (USB), inter-integrated circuit (IIC or I2C) bus, or an institute of electrical and electronics engineers (IEEE) standard 1394 bus, or "firewire," or other similar interconnection element.

In some examples, the interconnect may allow data communication between the processor 202 and the memory 204, which may include read-only memory (ROM) or flash memory (neither shown), and random-access memory (RAM). It should be appreciated that the RAM may be the main memory into which an operating system and various application programs may be loaded. The ROM or flash memory may contain, among other code, the basic input-output system (BIOS) which controls basic hardware operation such as the interaction with one or more peripheral components.

The processor 202 may be the central processing unit (CPU) of the computing device and may control an overall operation of the computing device. In some examples, the processor 202 may accomplish this by executing software or firmware stored in system memory or other data via the storage. The processor 202 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter (not shown in FIG. 2) may connect to various multimedia elements or peripherals. These may include a device associated with visual (e.g., video card or display), audio (e.g., sound card or speakers), and/or various input/output interfaces (e.g., mouse, keyboard, touchscreen).

Many other devices, components, elements, or subsystems (not shown) may be connected in a similar manner to the interconnect or via a network. Code or computer-readable instructions to implement the present disclosure may be stored in computer-readable storage media such as one or more of system memory or other storage. Code or computer-readable instructions to implement the present disclosure may also be received via one or more interfaces and stored in memory. The operating system provided on computer UE 104 may be MS-DOS®, MS-WINDOWS®, OS/2®, OS X®, IOS®, ANDROID®, UNIX®, Linux®, or another operating system.

Figure 3:
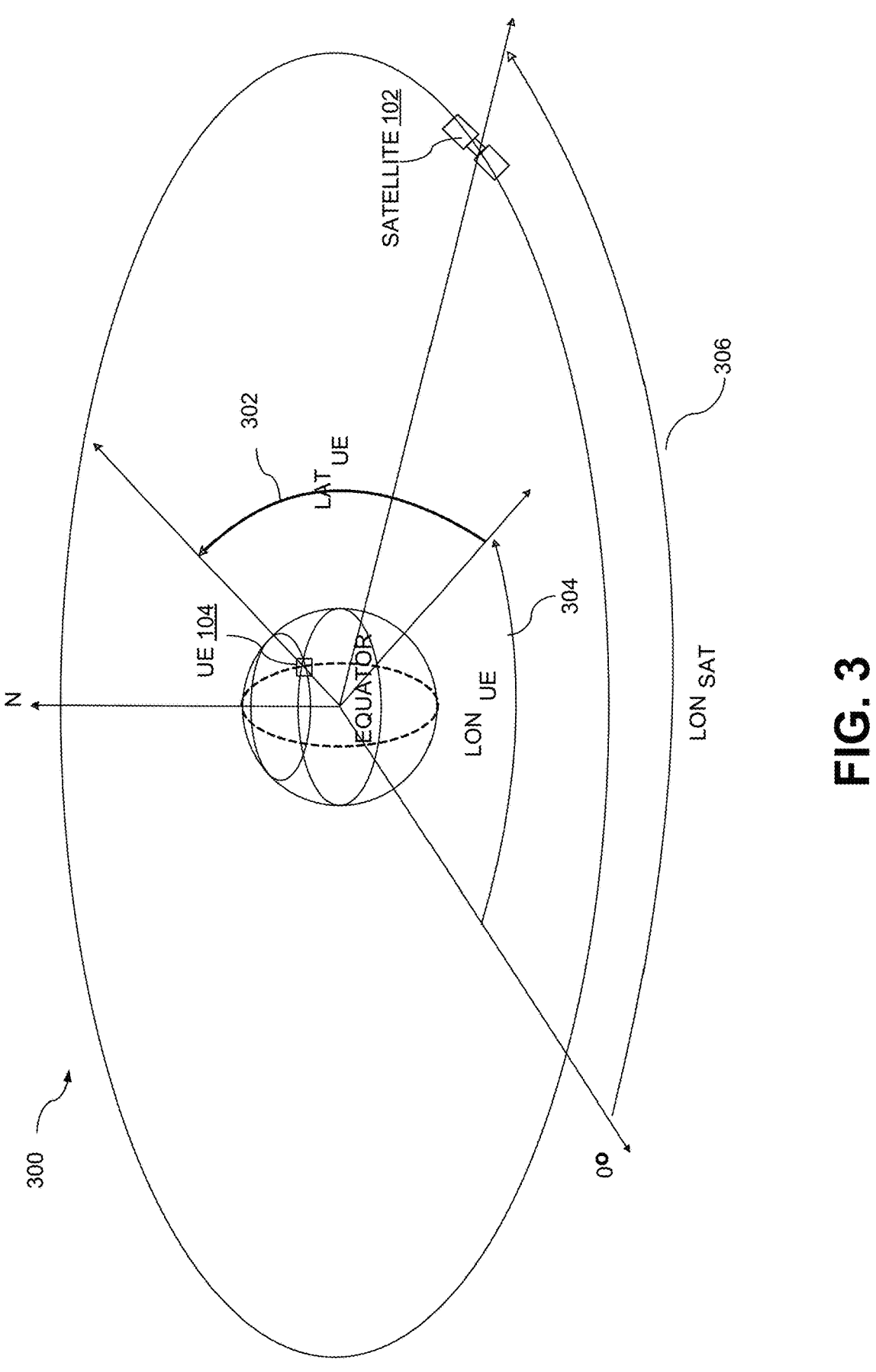
FIG. 3 illustrates an example schematic representation of a satellite communication network depicting location coordinates of a user equipment (UE) and a satellite, according to an example.

FIG. 3 illustrates an example schematic representation of a satellite communication network 100 depicting location coordinates of the UE 104 and the satellite 102, according to an example. The satellite communication network 100 depicts longitude coordinates of the GEO satellite 102 and latitude and longitude coordinates of the UE 104. The satellite latitude may be denoted as 'lat'$_{sat}$, and satellite longitude may be denoted as 'lon'$_{sat}$. Further, the latitude and longitude of the UE 104 or smart phone may be denoted as 'lat'$_{ue}$ and 'lon$_{ue}$'. In some examples, geodetic latitude and longitude of the UE 104 may be used in the calculation.

The satellite location information may include a satellite orbit information. The satellite orbit information may be used to indicate a satellite orbit to which a satellite base station belongs. Further, the satellite orbit information may further be used to indicate an altitude of the satellite orbit to which the satellite base station belongs. The satellite base station may be located in a polar constellation, and the satellite orbit to which the satellite base station may belong to the GEO satellite 102. In an embodiment, the GEO satellite base station may also be usually referred to as a geostationary orbit satellite 102. Further, an orbit altitude of the GEO satellite base station, for example, 35,786 km, and the satellite base station may be static relative to the ground and provides a large coverage area.

In an example, the satellite location information may be pre-stored in a database associated with the UE 104. In an example, the satellite location information may correspond to GEO satellite ephemeris data. The GEO satellite ephemeris data of the GEO satellite 102 corresponds to information that provides the satellite's precise position and velocity in space as a function of time. The GEO satellite ephemeris data may be used for tracking and predicting movements of the satellite, and may be used for various purposes, including satellite tracking, communication, navigation, and the like. The GEO satellite ephemeris data may include, but not limited to, position, velocity information of the GEO satellite 102, and the like. The GEO satellite ephemeris data may include, but is not limited to, the satellite's position coordinates such as latitude, longitude, altitude, and the like. Further, the GEO satellite ephemeris data may include velocity (speed and direction) in three-dimensional space, and the like. The information may typically be provided relative to a reference frame, such as for example, an Earth-centered Earth-fixed (ECEF) coordinate system, and the like.

In an embodiment, the longitude of the GEO satellite 102 (i.e., 'lon$_{sat}$') may be determined based on orbital parameters and position of the GEO satellite 102 relative to the Earth. The orbital parameters may include, but are not limited to, a semi-major Axis (a), an eccentricity (e), an inclination (i), an argument of perigee (ω), and a right ascension of the ascending node (Ω). Further, the semi-major axis may represent a long radius of an elliptical orbit of the satellite around the Earth. Further, the eccentricity measures the deviation of the orbit of the satellite from a perfect circle. The GEO satellites 102 may have nearly zero eccentricity, making their orbits very close to circular. Further, the inclination (i) refers to an angle between an orbital plane of the satellite and the plane of an equator of the Earth. For the GEO satellite 102, the inclination may be typically small, nearly zero. The argument of Perigee (ω) may refer to angle between an ascending node and the satellite's position at perigee (the point in its orbit closest to Earth). For the GEO satellite 102, this is usually not applicable, as their orbits are nearly circular. The right ascension of the ascending node (Ω) refers to angle between a vernal equinox and the ascending node (the point where the satellite crosses the equator moving north).

In an embodiment, the longitude of the GEO satellite 102 may be determined by the point on the equator of the Earth directly below the Earth. The point may be referred to as a "sub-satellite point". The longitude of the sub-satellite point may be calculated as shown in equation 1 below:

$$\text{Longitude } lon_{sat} = \Omega \qquad \text{Equation 1}$$

In other words, the longitude of the GEO satellite 'lon$_{sat}$' may be equal to a right ascension of the ascending node (Ω). This value may be provided in orbital parameters of the satellite.

In an example embodiment, the longitude of the GEO satellite 102 may be measured along an equatorial plane of the Earth. This may range from for example, 180 degrees to +180 degrees, with 0 degrees typically defined as a line passing through a prime meridian in Greenwich, England. The GEO satellite 102 has an orbital period equal to the rotational period of the Earth (approximately 24 hours). This means that the GEO satellite 102 orbits the Earth at the same rate that the Earth rotates. The longitude of the GEO satellite may be calculated based on its position relative to the rotation of the Earth. As the Earth spins, the satellite's position remains fixed with respect to a specific point on the Earth's surface. By measuring the time, the GEO satellite 102 takes to complete one orbit (which matches the Earth's rotation period) and obtaining the exact location of the satellite 102 at a specific point in time, the satellite longitude may be calculated.

In an example embodiment, the latitude and longitude coordinates 'lat$_{ue}$' and 'lon$_{ue}$' of the UE 104 may be obtained through signals received from a global navigation satellite system (GNSS) module inside the UE, such as for example, global positioning system (GPS).

Figure 4:
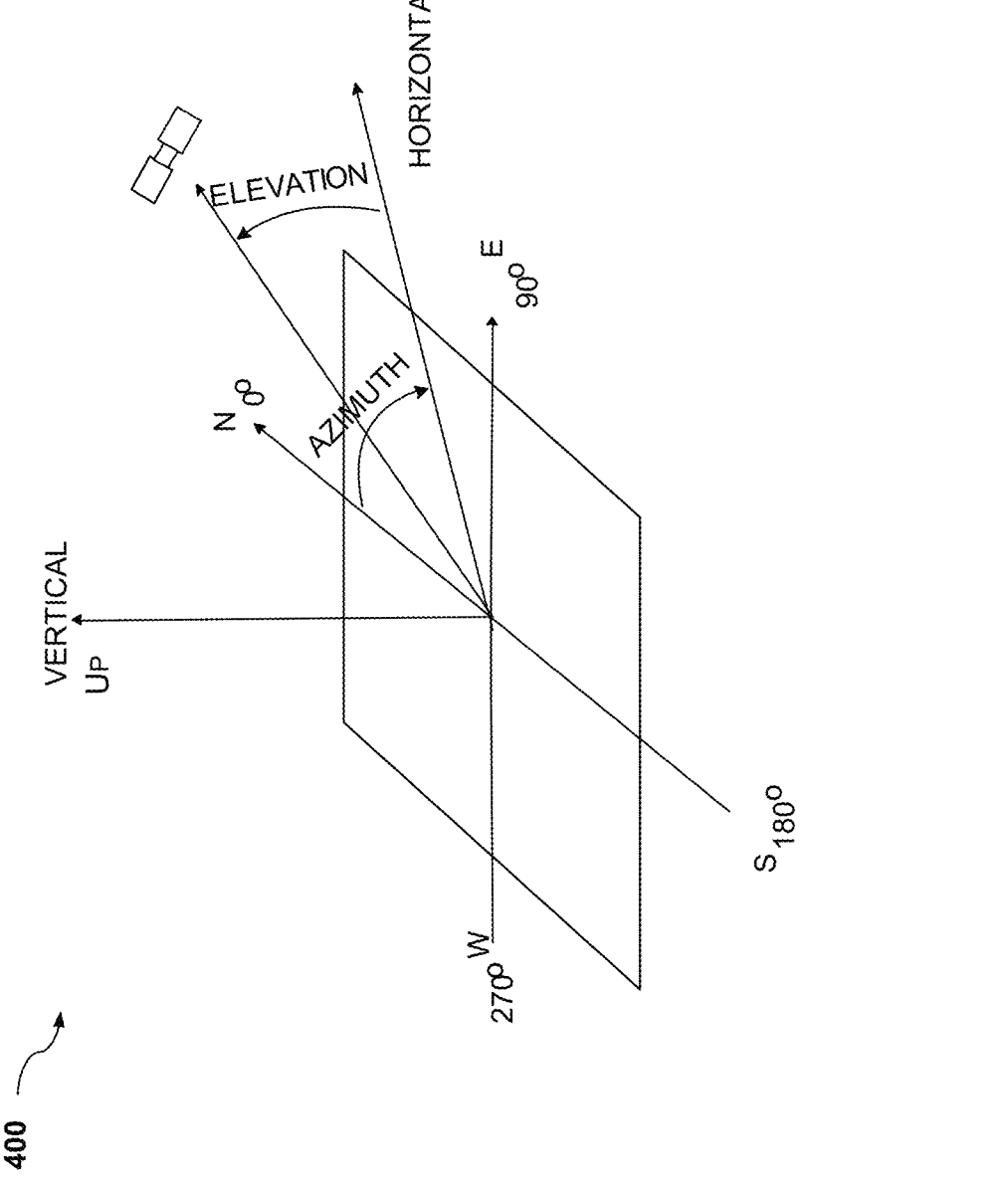
FIG. 4 illustrates an example graphical representation of a satellite communication network, depicting azimuth and elevation angle of a user equipment with respect to the satellite, according to an example.

FIG. 4 illustrates an example graphical representation of a satellite communication network 400, depicting azimuth and elevation angle of the UE 104 with respect to the GEO satellite 102, according to an example. In an embodiment, the direction of the GEO satellite 102 at a position of the user may be of significant interest regarding finding the GEO satellite 102 and pointing the smart phone or UE 104 at the GEO satellite 102. The direction may normally be given in terms of an azimuth angle and an elevation angle in a topocentric horizon system. The azimuth angle of the UE 104 may normally be specified as relative to true North. The elevation angle of the UE 104 may normally be specified as relative to local horizontal. In an embodiment, an S-band GEO satellite may have a fixed elevation and azimuth angles for each UE at certain geolocation.

In an embodiment, the azimuth angle at the UE 104 may be calculated using equation 2 below:

$$\alpha = \tan^{-1}\left(\frac{\tan|(lon_{ue} - lon_{sat})|}{\sin(lat_{ue})}\right) \qquad \text{equation (2)}$$

In a scenario, if the UE 104 is in the northern hemisphere with:

a)

Satellite to south east (*SE*) of the *UE* 104, $Az_{ue} = 180° - \alpha$    equation (3)

b)

Satellite to south west (*SW*) of the *UE* 104, $Az_{ue} = 180° + \alpha$    equation (4)

In another scenario, if the UE 104 is in the Southern hemisphere with:

a)

Satellite to the north east (*NE*) of the *UE* 104, $Az_{ue} = \alpha$    equation (5)

b)

Satellite to the north west (*NW*) of the *UE* 104,    equation (6)
$$Az_{ue} = 360° - \alpha$$

In an embodiment, the elevation angle at the UE 104 may be calculated as shown in equation 7 below:

$$El_{ue} = \tan^{-1}\left(\frac{\cos(lat_{ue})\cos(lon_{ue} - lon_{sat}) - \frac{R_0}{R_0 + h}}{\sqrt{1 - (\cos(lat_{ue})\cos(lon_{ue} - lon_{sat}))^2}}\right) \qquad \text{equation (7)}$$

In the above equation 7, the variable 'h' may be a satellite height which is approximately 35800 km, further, the variable 'R'$_0$ 6371 km may be the radius of the earth. The equatorial radius may be 6378 km, however the polar radius may be 6357 km.

Figure 5A:
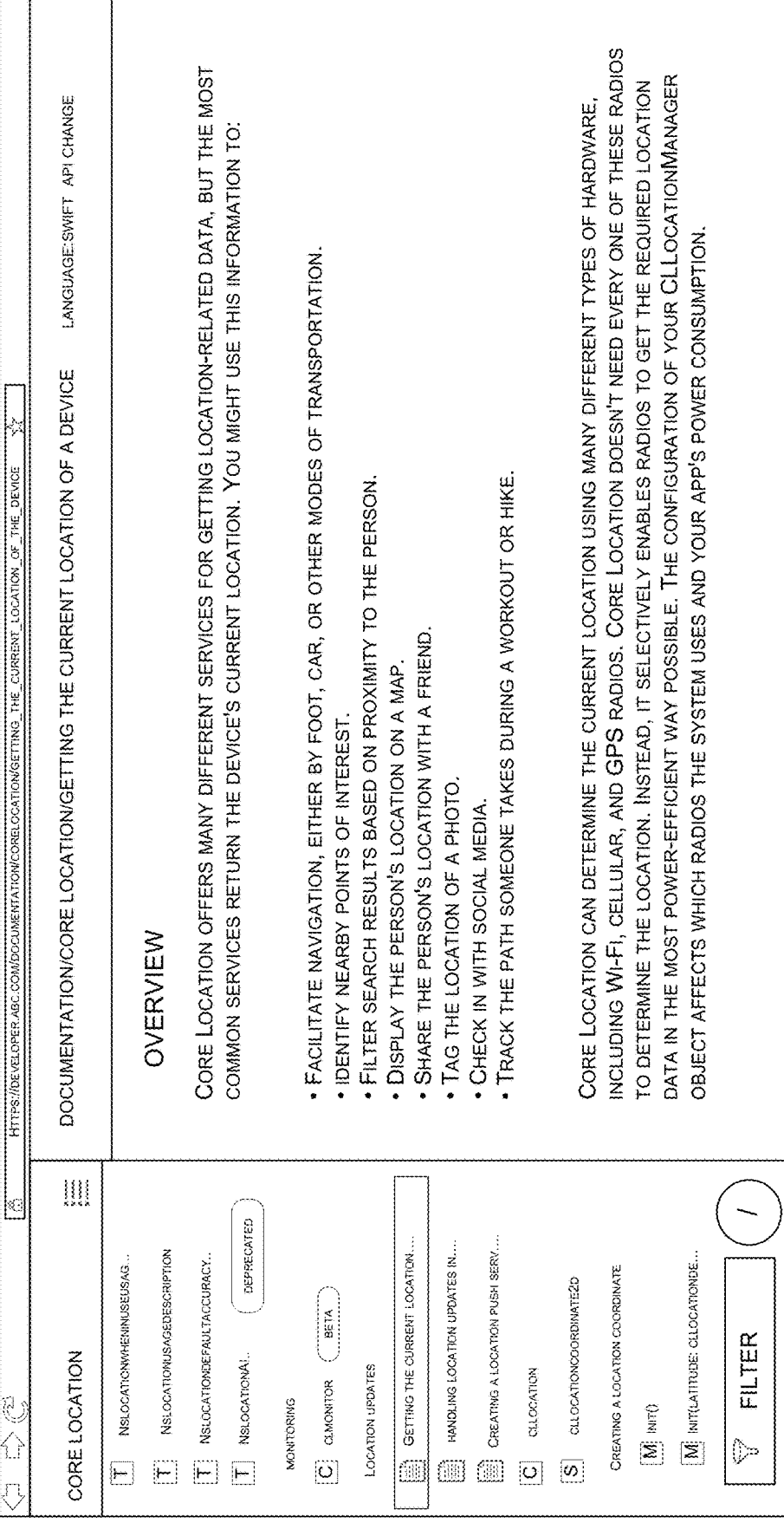
FIGS. 5A and 5B illustrate example device driver library of a user equipment for obtaining a location service of the user equipment, according to an example.
Figure 5B:
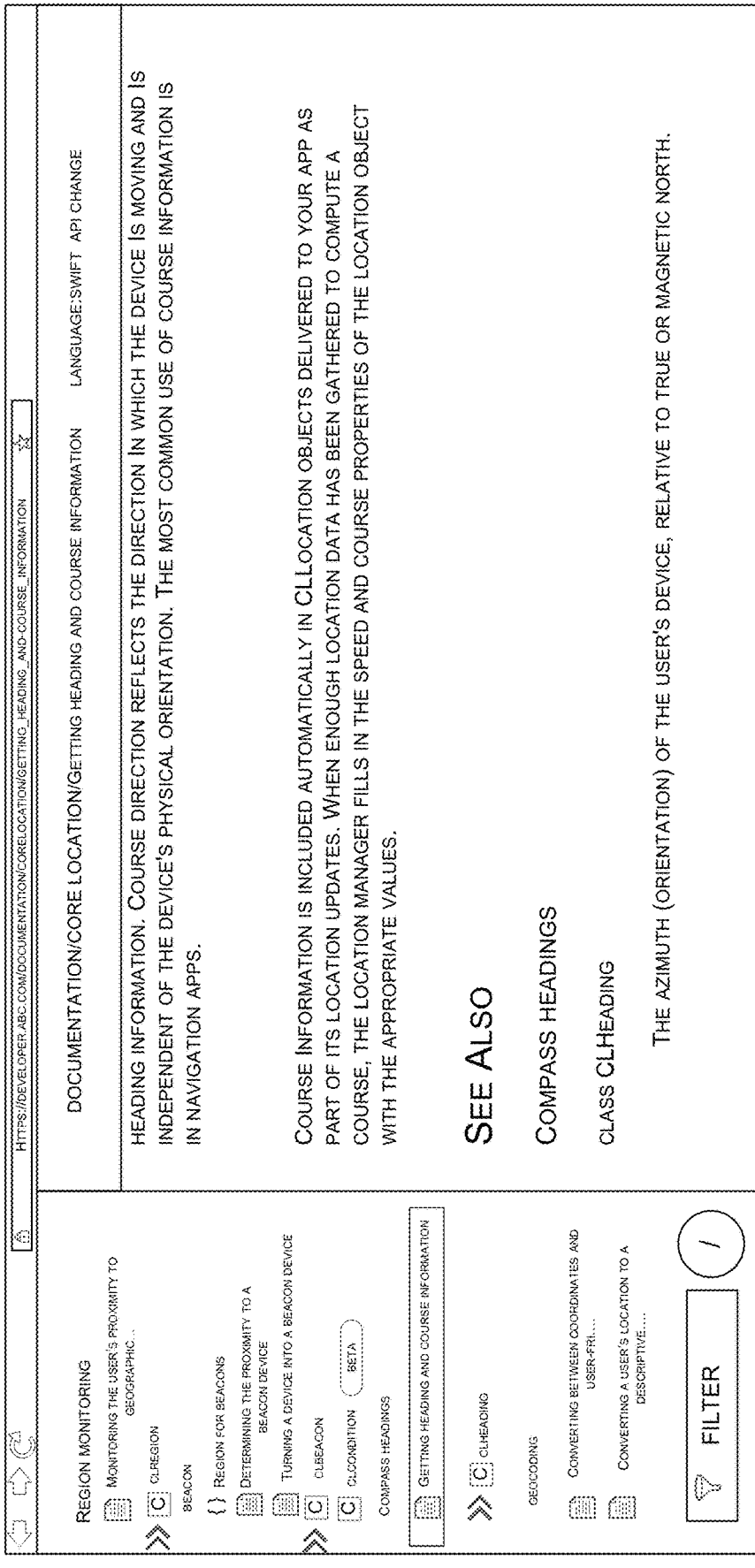

FIGS. 5A and 5B illustrate example device driver library of the UE 104 for obtaining location service of the UE 104, according to an example.

In an example embodiment, FIG. 5A depicts an example of available location service function of the UE 104 location service. The UE 104 requires permission to location service function to access core location data, the output of the location service function is class core location (CLLocation) which may include the latitude, the longitude, and course information of the UE 104. In an embodiment, the latitude coordinate of the UE 104 includes positive values which indicate latitudes north of the equator. Negative values indicate latitudes south of the equator. Further, the longitude coordinate of the UE 104 may include measurements relative to a zero meridian, with positive values extending east of the meridian and negative values extending west of the meridian.

In an example embodiment, FIG. 5B depicts an example of available location service function of the UE 104. The location information of the UE 104 may include heading information. The heading information may be available on devices with a built-in magnetometer. The heading of the UE 104 may be current orientation of the UE 104 relative to its magnetic or true north.

Further, the location information of the UE 104 may further include course information. The course information reflects speed and direction in which a device is moving and is available on devices with GPS hardware. The heading of a user's device is its current orientation relative to magnetic or true north.

Figure 6A:
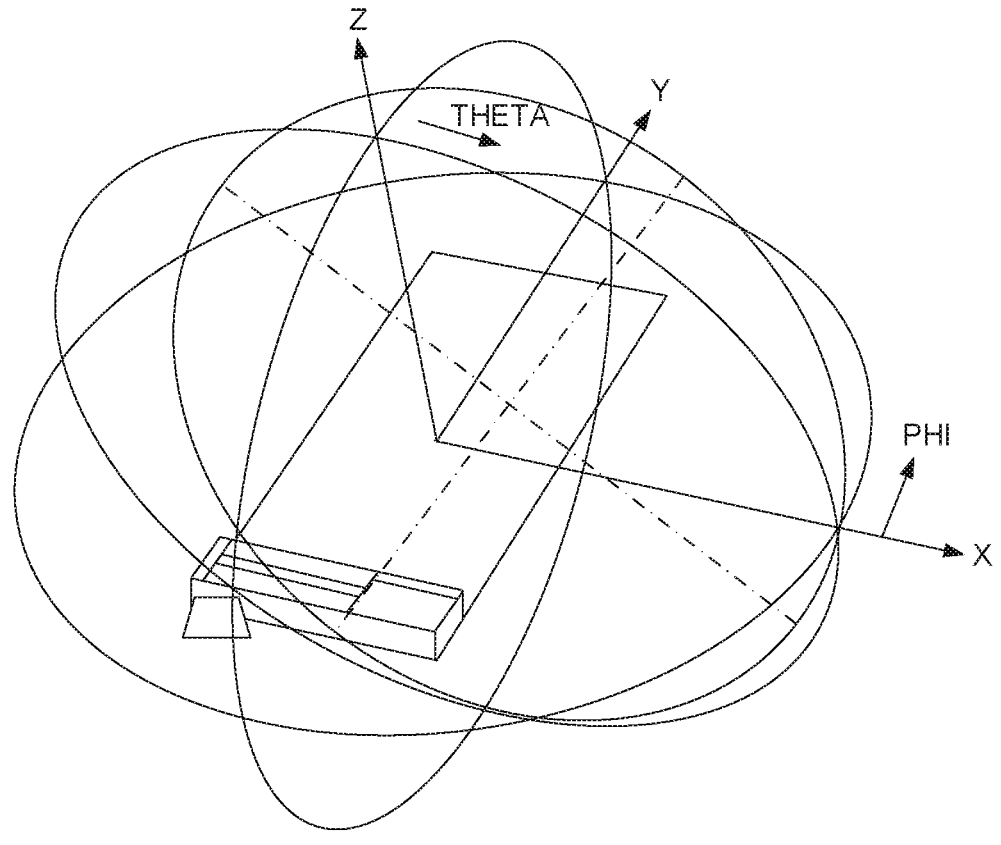
FIGS. 6A-6D illustrate example heat map representations of radiation patterns in a user equipment, according to an example.
Figure 6B:
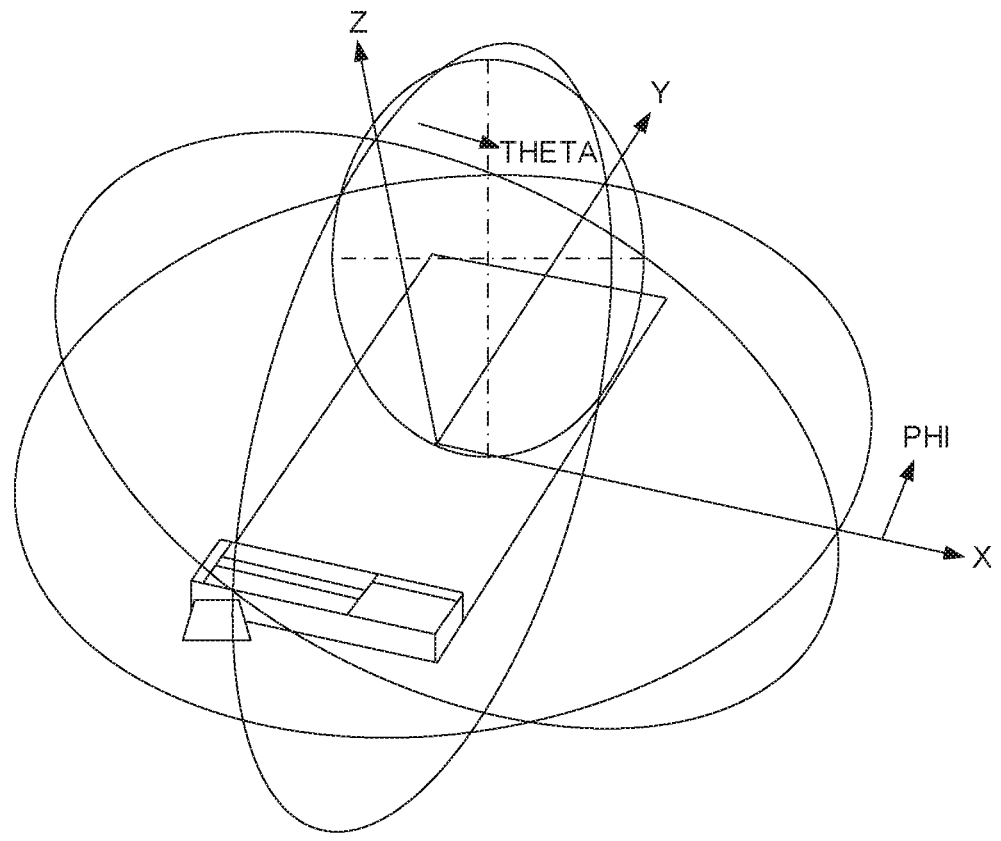
Figure 6C:
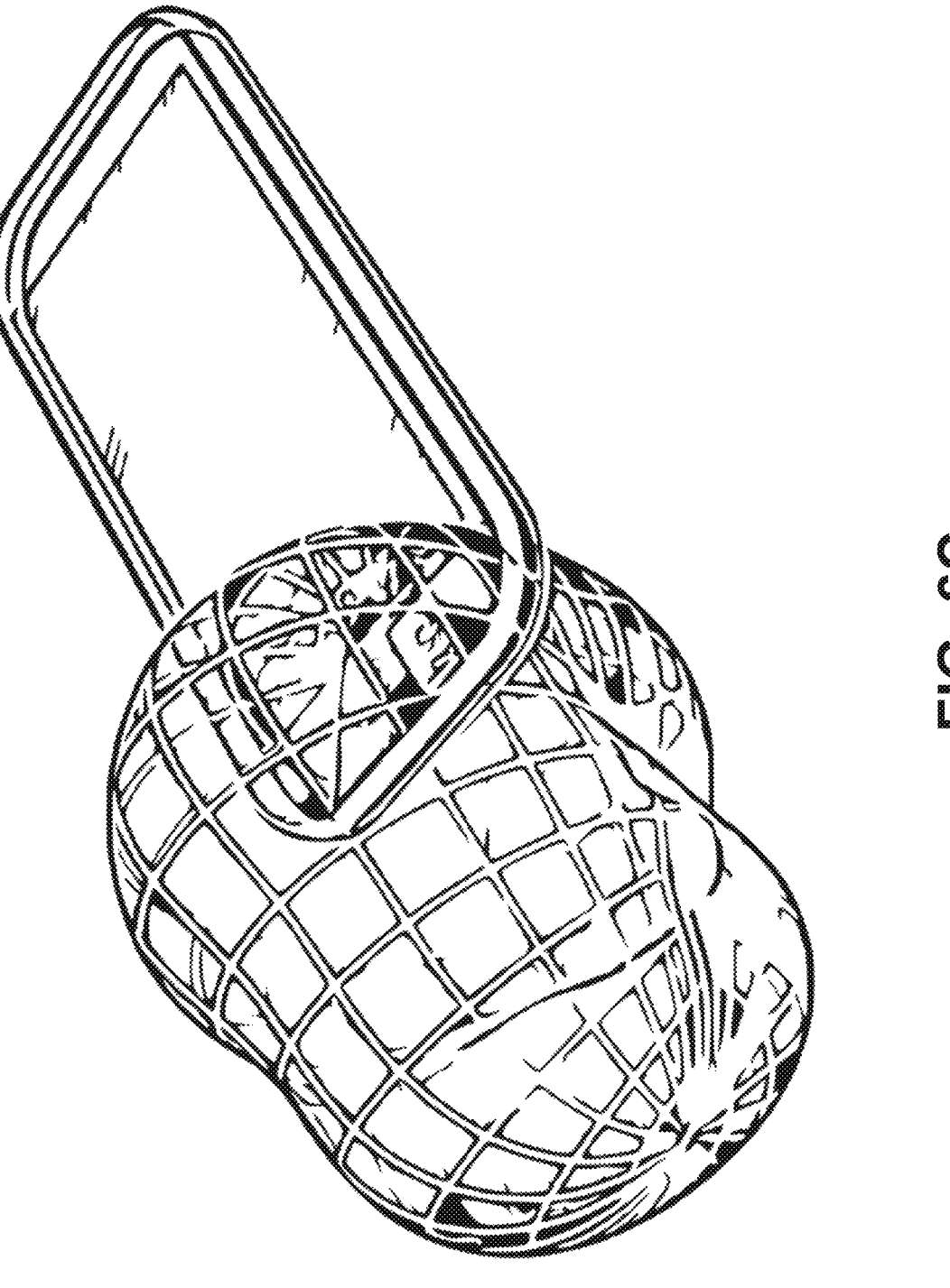
Figure 6D:
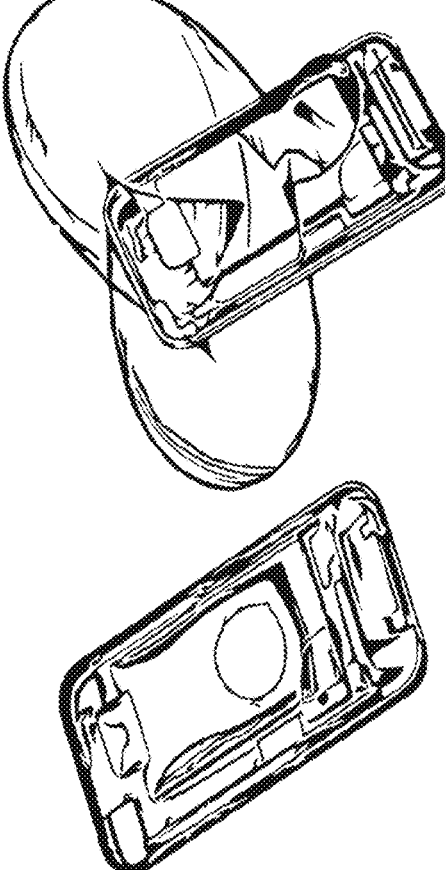
Figure 6D:
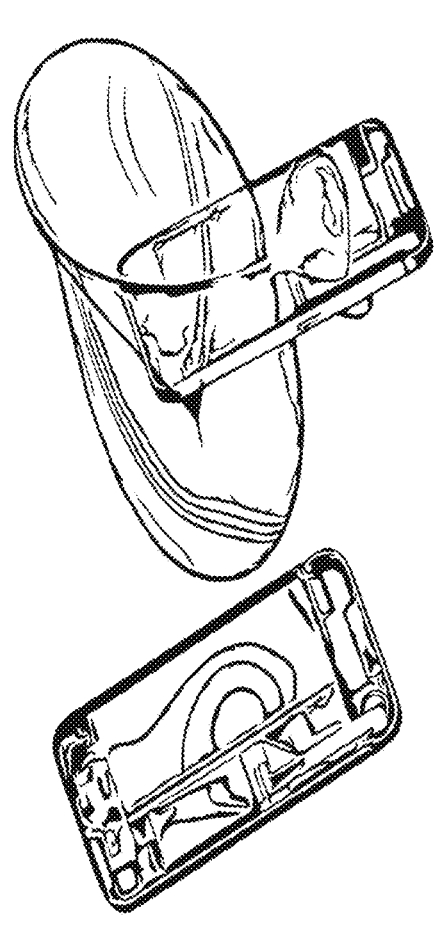

FIGS. 6A-6D illustrate example heat map representations of radiation patterns in the UE 104, according to an example. FIG. 6A and FIG. 6B depicts a radiation pattern of an original ground planar inverted F antenna (OG PIFA) in the UE 104. Further, a planar inverted-F antenna (PIFA) may be a common and a popular choice for miniaturized antennas in cellular phones or the UE 104. The radiation pattern of the OG PIFA antenna depicts an antenna radiation or receiving of the electromagnetic energy in three-dimensional space. The radiation pattern of the OG PIFA antenna may be a three-dimensional representation of its antenna gain in all directions. The pattern represents radiation of the antenna energy in both horizontal and vertical planes. Further, the radiation pattern of the OG PIFA antenna may be directional, indicating that it emits or receives more energy in certain directions compared to others. This directionality may be influenced by specific design and placement of the antenna. Furthermore, the radiation pattern indicates a beamwidth, which is angular width of a main lobe (the region of highest radiation intensity). A narrower beamwidth refers that the antenna is more directional, while a wider beamwidth implies a broader coverage area. The radiation pattern may further provide information about gain of the antenna in different directions. Gain represents the ability of the antenna to focus its energy in a specific direction. Higher gain antennas may transmit or receive signals over longer distances. In addition to the main lobe, the radiation pattern may show side lobes. These are smaller lobes of radiation that occur in directions other than the main beam. Minimizing side lobes may be important for maintaining directional focus.

In an embodiment, the radiation pattern may usually be represented as two separate plots: one for the azimuth plane (horizontal) and one for the elevation plane (vertical). These plots provide detailed information about the performance of the antenna in different orientations. Furthermore, the radiation pattern may be visualized using a polar plot, which shows the antenna's gain as a function of angle. In this plot, the azimuth angle represents horizontal direction, and the elevation angle represents vertical direction. The specific characteristics of the radiation pattern depend on the design and construction of the OG PIFA antenna, as well as the placement within the UE 104.

Further, FIG. 6A depicts the radiation pattern at 0.8 GHz and FIG. 6B depicts the radiation pattern at 1.8 GHz.

FIG. 7A illustrates an example to access signal power and quality of a certain user equipment, according to an example. According to FIG. 7A, the UE 104 allows the user to obtain a satellite downlink Reference Signals Received Power (RSRP) (also referred herein as RSRP) and Reference Signal Received Quality (RSRQ) information which are pre-stored in the UE 104 database. In an embodiment, the satellite downlink RSRP and RSRQ are key measures of signal level and quality for modern LTE networks. The satellite downlink reference signal received power (RSRP) may be an RSSI type of measurement. The satellite downlink RSRP may be the power of the LTE Reference Signals spread over the full bandwidth and narrowband. A minimum of for example, −20 dB SINR (of the S-Synch channel) may be needed to detect RSRP/RSRQ.

Further, the RSRQ, Quality considering with RSSI and the number of used resource blocks (N), may be shown in equation 8 below:

$$RSRQ = (N * RSRP)/RSSI \qquad \text{equation (8)}$$

For example, the RSRQ may be measured over same bandwidth. The RSRQ may be a carrier-to-interference (C/I) type of measurement, and the RSRQ may indicate a quality of the received reference signal. The RSRQ measurement may provide additional information, when the RSRP is not sufficient to help the user to decide the placement of the UE after the azimuth angle alignment.

FIG. 7B illustrates an example tabular representation depicting the signal strength level and the signal quality level of the UE 104, according to an example. FIG. 7B depicts a range of signal strength and quality measures.

Figure 8:
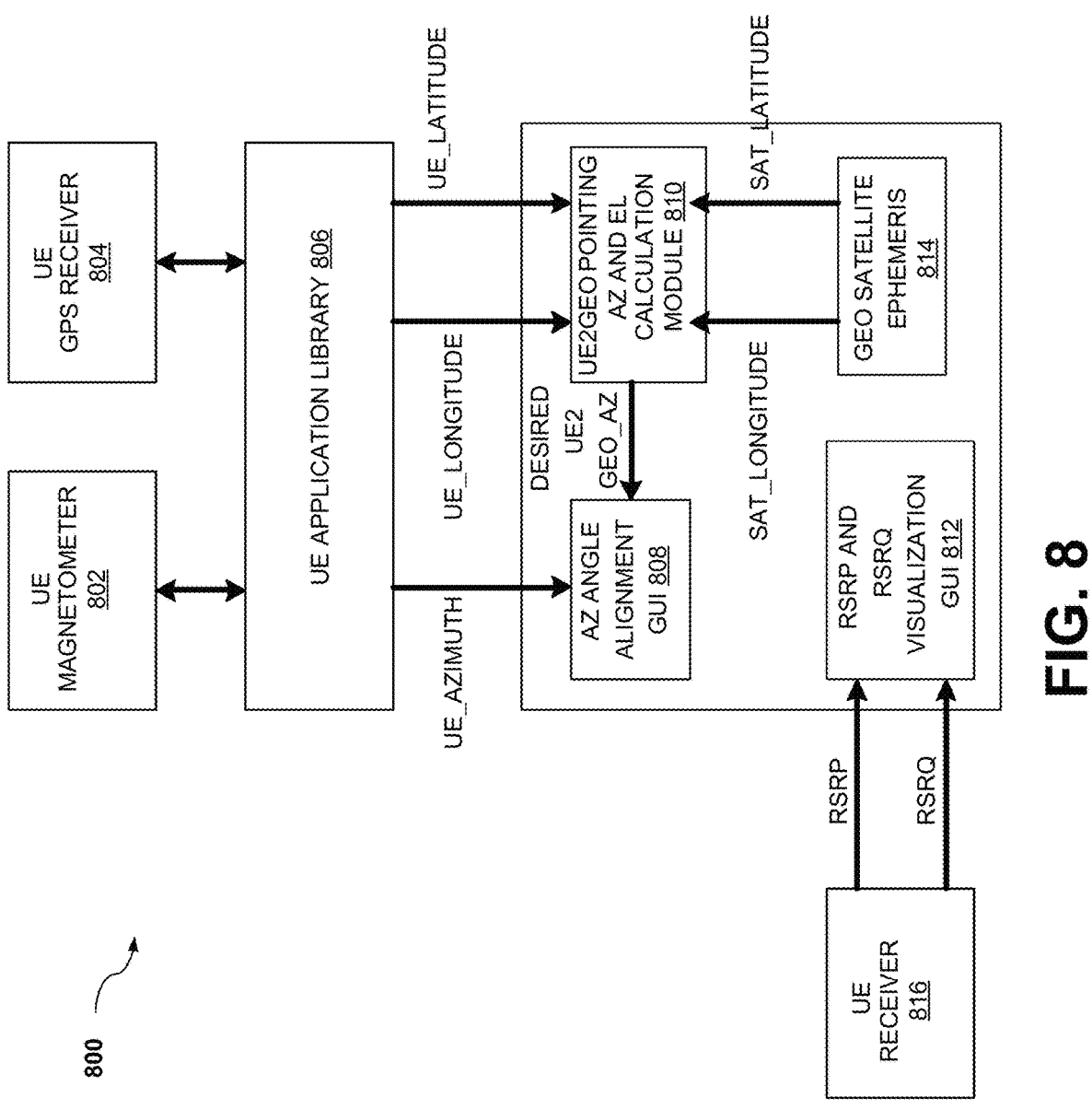
FIG. 8 illustrates an example block diagram representation of a satellite communication network depicting interaction within components of the user equipment, according to an example.

FIG. 8 illustrates an example block diagram representation of a satellite communication system 800 depicting interaction between components within the UE 104, according to an example. The UE 104 may obtain a UE azimuth angle from an in-built UE magnetometer 802. Further, the UE 104 may include an azimuth angle alignment graphical user interface (GUI) 808 and a UE to GEO (also referred as UE2GEO) pointing azimuth and elevation angle calculation module 810. The UE2GEO pointing azimuth and elevation angle calculation module 810 obtains real time UE longitude, and UE latitude using a GPS receiver 804 inside UE

104. Further, the UE2GEO pointing azimuth and elevation angle calculation module 810 obtains satellite longitude and satellite latitude coordinates from a GEO satellite ephemeris data 814 which are prestored in the memory of UE. The UE2GEO pointing azimuth and elevation angle calculation module 810 then calculates the threshold azimuth angle between the user equipment 104 and the GEO satellite 102 based on the current location information. The UE2GEO pointing azimuth and elevation angle calculation module 810 feeds the calculated threshold azimuth angle between the user equipment 104 and the GEO satellite 102 to the azimuth angle alignment GUI 808. The azimuth angle alignment GUI 808 further determines the deviation between the determined azimuth angle (UE_AZIMUTH) and the threshold azimuth angle (DESIRED UE2GEO_AZ) of the user equipment 104 I. Further, the azimuth angle alignment GUI 808 determines a deviation level between the computed threshold azimuth angle and the determined azimuth angle of the user equipment 104 and generates an alignment recommendation message for the user equipment 104 at real-time based on the determined deviation level. The alignment recommendation message helps to instruct user to turn the UE 104 in the direction of the satellite 102 to minimize the difference between the computed threshold azimuth angle (or also referred as desired azimuth angle) and the determined azimuth angle of the user equipment 104 (or also referred as actual azimuth angle).

Further, the UE 104 may include the RSRP and the RSRQ visualization GUI 812 to validate the generated alignment recommendation message based on at least one of a signal strength, and a signal quality associated with the user equipment 104. The UE 104 may obtain signal strength, and the signal quality from a UE receiver 816. The RSRP and RSRQ Visualization GUI 812 may apply color code to indicate signal power and quality levels. Different colors may be mapped to different range of values as shown in table of FIG. 7B. This may help the user to fine tune the facing of the UE 104 to maximize signal power as well as achieve better signal quality.

Further, the UE 104 dynamically initiates transmission of the at least one emergency message from the user equipment 104 to the GEO satellite 102 via the communication network.

Figure 9:
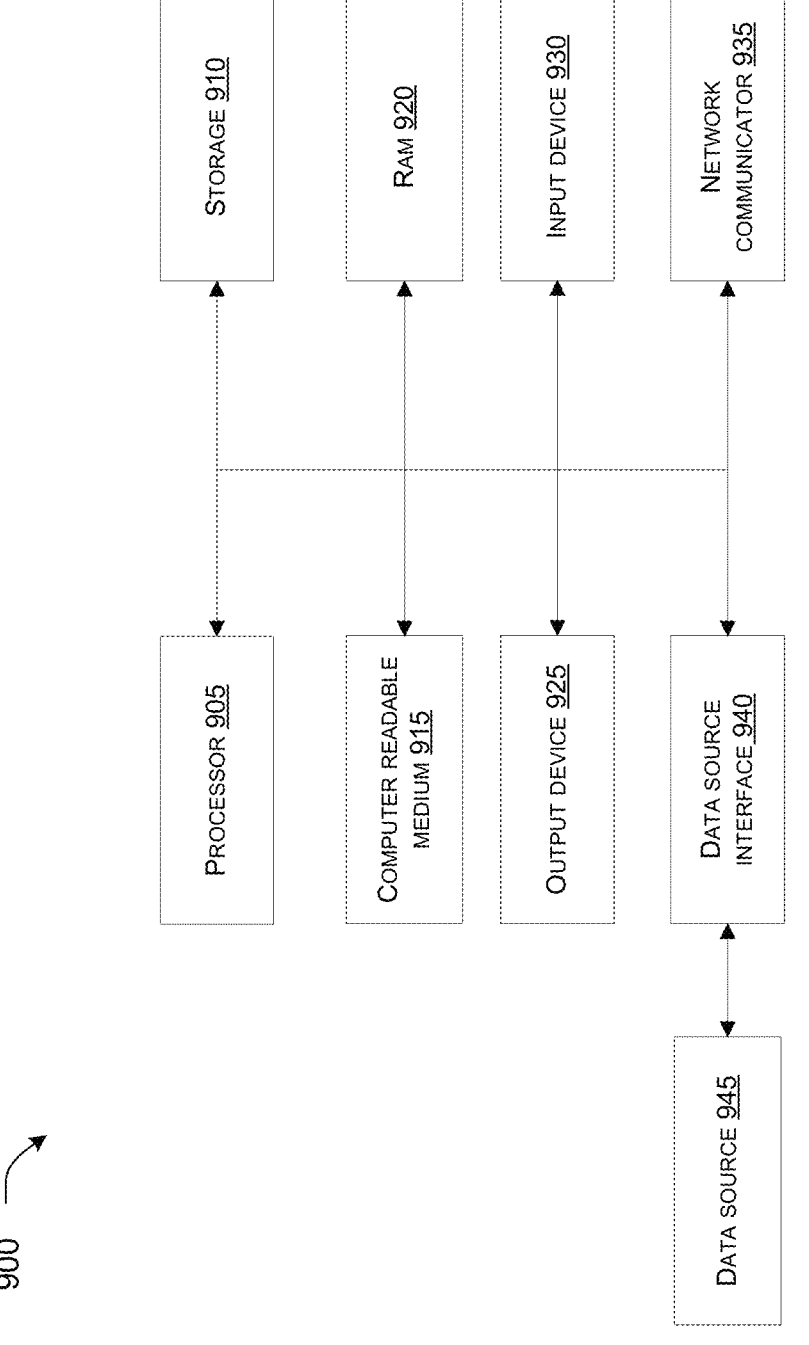
FIG. 9 illustrates a hardware platform for implementation of the system, according to an example.

FIG. 9 illustrates a hardware platform 900 for implementation of the system 900, according to an example. In an example, the hardware platform 900 may be a computer system 900 that may be used with the examples described herein. The computer system 900 may represent a computational platform that includes components that may be in a server or another computer system. The computer system 900 may execute, by a processor (e.g., a single or multiple processors) or other hardware processing circuit, the methods, functions, and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 900 may include a processor 905 that executes software instructions or code stored on a non-transitory computer readable storage medium 910 to perform methods of the present disclosure. The software code includes, for example, instructions to obtain data, reconcile data, generate confidence score, and perform summarization. In an embodiment, the plurality modules 206 may include, but are not limited to, a receiving module, a location determination module, an azimuth angle computation module, an alignment recommendation module, a validation module, an emergency message handling module, a transmission module are a software code or a component performing the above steps.

The instructions on the computer readable storage medium 910 are read and stored the instructions in storage 915 or in random access memory (RAM) 920. The storage 915 provides a large space for keeping static data where at least some instructions could be stored for later execution. The stored instructions may be further compiled to generate other representations of the instructions and dynamically stored in the RAM 920. The processor 905 reads instructions from the RAM 920 and performs actions as instructed.

The computer system 900 further includes an output device 925 to provide at least some of the results of the execution as output including, but not limited to, visual information to users, such as external agents. The output device can include a display on computing devices. For example, the display can be a mobile phone screen or a laptop screen. GUIs and/or text are presented as an output on the display screen. The computer system 900 further includes input device 930 to provide a user or another device with mechanisms for entering data and/or otherwise interact with the computer system 900. The input device may include, for example, a keyboard, a keypad, a mouse, or a touchscreen. In an embodiment, output of the intelligent risk management agent is displayed on the output device 925. Each of these output devices 925 and input devices 930 could be joined by one or more additional peripherals.

A network communicator 935 may be provided to connect the computer system 900 to a network and in turn to other devices connected to the network including other clients, servers, data stores, and interfaces, for instance. A network communicator 935 may include, for example, a network adapter such as a LAN adapter or a wireless adapter. The computer system 900 includes a data source interface 940 to access data source 945.

FIG. 10 illustrates an example flow diagram representation of a method for managing emergency messaging services, according to an example. The disclosed method 1000 may be performed by one or more components of the UE 104 disclosed herein. For example, with reference to FIG. 2, the steps disclosed herein may be performed by the processor 202.

At block 1002, the method 1000 may include receiving, by a processor 202, a request for transmitting at least one emergency message from a user equipment (UE) 104 to a geosynchronous equatorial orbit (GEO) satellite 102.

At block 1004, the method 1000 may include determining, by the processor 202, current location information associated with the UE 104. The current location information may include latitude coordinates, longitude coordinates, and a heading information.

At block 1006, the method 1000 may include determining, by the processor 202, a satellite location associated with the geosynchronous equatorial orbit (GEO) satellite 102 in proximity to the determined current location information associated with the UE 104.

At block 1008, the method 1000 may include computing, by the processor 202, a threshold azimuth angle between the user equipment 104 and the GEO satellite 102 based on the current location information associated with the user equipment 104 and the determined satellite location.

At block 1010, the method 1000 may include determining, by the processor 202, an azimuth angle of the UE 104 based on the determined current location information associated with the UE 104.

At block 1012, the method 1000 may include determining, by the processor 202, a deviation level between the computed threshold azimuth angle and the determined azimuth angle of the UE 104.

At block 1014, the method 1000 may include generating, by the processor 202, an alignment recommendation message for the UE 104 at real-time based on the determined deviation level. The generated alignment recommendation message may include at least one action for navigating the user equipment to a specific location and specific angle based on the determined azimuth angle.

At block 1016, the method 1000 may include validating, by the processor 202, the generated alignment recommendation message based on at least one of a signal strength and a signal quality associated with the UE 104.

At block 1018, the method 1000 may include dynamically initiating, by the processor 202, transmission of the at least one emergency message from the UE 104 to the GEO satellite 102 via a communication network.

The order in which the method 1000 is described is not intended to be construed as a limitation, and any number of the described method blocks may be combined or otherwise performed in any order to implement the method 1000 or an alternate method. Additionally, individual blocks may be deleted from the method 1000 without departing from the spirit and scope of the ongoing description. Furthermore, the method 1000 may be implemented in any suitable hardware, software, firmware, or a combination thereof, that exists in the related art or that is later developed. The method 1000 describes, without limitation, the implementation of the UE 104. A person of skill in the art will understand that method 1000 may be modified appropriately for implementation in various manners without departing from the scope and spirit of the ongoing description.

Various examples of systems and methods for managing emergency messaging services in satellite communication environment, may be provided. Various example implementations of the disclosed approach herein may provide systems and methods for leveraging advantages provided by S-band GEO satellites to enhance the accessibility and effectiveness of emergency messaging services for cellular terminal owners in areas lacking cellular coverage.

In an example embodiment, the S-band GEO satellite 102 has fixed elevation and azimuth angles for each user. In a significant portion of its coverage area, users have a reasonable elevation angle, thus, less vulnerable to signal blockage. In areas with low elevation angle, given the elevation and azimuth angles, users can be directed to move to find a clear view of the satellite 102 and start to send message.

One of ordinary skill in the art will appreciate that techniques consistent with the ongoing description are applicable in other contexts as well without departing from the scope of the ongoing description.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for managing network communication.

It should also be appreciated that the systems and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as high throughput satellite (HTS) systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related tests and measurements.

What has been described and illustrated herein are examples of the implementation along with some variations. The terms, descriptions, and figures used herein are set forth by way of illustration only and are not meant as limitations. Many variations are possible within the scope of the implementations, which is intended to be defined by the following claims—and their equivalents—in which all terms are meant in their broadest reasonable sense unless otherwise indicated.

The invention claimed is:

1. A system comprising:

a processor; and a memory coupled to the processor, wherein the memory comprises processor-executable instructions, which on execution, cause the processor to:

receive a request for transmitting at least one emergency message from a user equipment (UE) to a geosynchronous equatorial orbit (GEO) satellite;

determine current location information associated with the user equipment, wherein the current location information comprises latitude coordinates, longitude coordinates, and a heading information;

determine a satellite location associated with the geosynchronous equatorial orbit (GEO) satellite in proximity to the determined current location information associated with the user equipment;

compute a threshold azimuth angle between the user equipment and the GEO satellite and an elevation angle of the user equipment based on the current location information associated with the user equipment and the determined satellite location, wherein the elevation angle of the user equipment is computed based on a satellite height, a radius of earth, longitude coordinates of the GEO satellite, latitude coordinates, and the longitude coordinates of the user equipment;

determine an azimuth angle of the user equipment based on the determined current location information associated with the user equipment;

determine a deviation level between the computed threshold azimuth angle and the determined azimuth angle of the user equipment;

generate an alignment recommendation message for the user equipment at real-time based on the determined deviation level, wherein the generated alignment recommendation message comprises at least one action for navigating the user equipment to a specific location and at a specific angle;

validate the generated alignment recommendation message based on at least one of a signal strength, and a signal quality associated with the user equipment; and dynamically initiate transmission of the at least one emergency message from the user equipment to the GEO satellite via a communication network.

2. The system of claim 1, wherein the heading information comprises a current orientation of the user equipment relative to a magnetic north.

3. The system of claim 1, wherein the processor is to:

modify the alignment recommendation message based on at least one of the signal strength, and the signal quality, associated with the user equipment.

4. The system of claim 1, wherein to determine the satellite location associated with the GEO satellite in proximity to the determined current location information associated with the user equipment, the processor is to:

determine the GEO satellite in proximity to the determined current location information associated with the user equipment; and determine the latitude coordinates and the longitude coordinates of the determined GEO satellite using a pre-stored satellite library.

5. The system of claim 1, wherein to determine the azimuth angle of the user equipment based on the determined current location information associated with the user equipment the processor is to:

determine heading information associated with the user equipment using a pre-stored location library; and determine the azimuth angle of the user equipment based on the determined heading information.

6. The system of claim 1, wherein to compute the threshold azimuth angle between the user equipment and the GEO satellite and the elevation angle of the user equipment based on the current location information associated with the user equipment and the determined satellite location, the processor is to:

determine the latitude coordinates and the longitude coordinates of the user equipment from a prestored location library;

determine the longitude coordinates of the GEO satellite in proximity to the determined current location information associated with the user equipment;

compute a variable based on the determined longitude coordinates of the GEO satellite, and the determined latitude coordinates and the longitude coordinates of the user equipment;

determine the threshold azimuth angle of the user equipment based on a difference between the computed variable difference and 180° angle in a specific direction;

determine the satellite height of the GEO satellite based on a prestored satellite library;

determine the radius of the earth based on the prestored satellite library; and determine the elevation angle of the user equipment based on the determined satellite height, the radius of the earth, the longitude coordinates of the GEO satellite, the latitude coordinates, and the longitude coordinates of the user equipment.

7. The system of claim 1, wherein to determine the deviation level between the computed threshold azimuth angle and the determined azimuth angle of the user equipment, the processor is to:

determine a difference between the computed threshold azimuth angle with the determined azimuth angle based on mapping; and determine the deviation level between the computed threshold azimuth angle and the determined azimuth angle of the user equipment based on the determined difference.

8. The system of claim 1, wherein to generate the alignment recommendation message for the user equipment at real-time based on the determined deviation level, the processor is to:

determine a target direction of the user equipment based on the determined deviation level of the user equipment;

generate a navigation path between the current location of the user equipment and the determined target direction of the user equipment; and generate the alignment recommendation message for the user equipment at real-time based on the generated navigation path, wherein the alignment recommendation message comprises at least one instruction to adjust a position and an angle of the user equipment closer to the computed threshold azimuth angle.

9. The system of claim 1, wherein to validate the generated alignment recommendation message based on at least one of the signal strength, and the signal quality, associated with the user equipment, the processor is to:

determine a satellite downlink reference signal received power (RSRP) value associated with the user equipment using a pre-stored signal library;

determine a satellite downlink signal strength level of the user equipment based on the determined satellite downlink RSRP value;

determine a reference signal received quality (RSRQ) value associated with the user equipment using the pre-stored signal library;

determine a signal quality level of the user equipment based on the determined RSRQ value;

compare each of the determined signal strength level, and the signal quality level, of the user equipment with corresponding threshold signal strength level, and a threshold signal quality level, of the user equipment; and validate the generated alignment recommendation message based on results of comparison, wherein the transmission of the emergency messages is initiated upon determining that the determined signal strength level, and the signal quality level, of the user equipment matches with the corresponding threshold signal strength level, and the threshold signal quality level.

10. The system of claim 1, wherein the processor is to:

transmit the emergency messages from the user equipment to the GEO satellite via the communication network.

11. A method, comprising:

receiving, by a processor, a request for transmitting at least one emergency message from a user equipment (UE) to a geosynchronous equatorial orbit (GEO) satellite;

determining, by the processor, current location information associated with the user equipment, wherein the current location information comprises latitude coordinates, longitude coordinates, and a heading information;

determining, by the processor, a satellite location associated with the geosynchronous equatorial orbit (GEO) satellite in proximity to the determined current location information associated with the user equipment;

computing, by the processor, a threshold azimuth angle between the user equipment and the GEO satellite and an elevation angle of the user equipment based on the current location information associated with the user equipment and the determined satellite location, wherein the elevation angle of the user equipment is computed based on a satellite height, a radius of earth, longitude coordinates of the GEO satellite, latitude coordinates, and the longitude coordinates of the user equipment;

determining, by the processor, an azimuth angle of the user equipment based on the determined current location information associated with the user equipment;

determining, by the processor, a deviation level between the computed threshold azimuth angle and the determined azimuth angle of the user equipment;

generating, by the processor, an alignment recommendation message for the user equipment at real-time based on the determined deviation level, wherein the generated alignment recommendation message comprises at least one action for navigating the user equipment to a specific location and at a specific angle based on the determined azimuth angle;

validating, by the processor, the generated alignment recommendation message based on at least one of a signal strength, and a signal quality associated with the user equipment; and dynamically initiating, by the processor, transmission of the at least one emergency message from the user equipment to the GEO satellite via a communication network.

12. The method of claim 11, further comprising:

modifying, by the processor, the alignment recommendation message based on at least one of the signal strength, and the signal quality associated with the user equipment.

13. The method of claim 11, wherein determining the satellite location associated with the GEO satellite in proximity to the determined current location information associated with the user equipment comprises:

determining, by the processor, the GEO satellite in proximity to the determined current location information associated with the user equipment; and determining, by the processor, the latitude coordinates and the longitude coordinates of the determined GEO satellite using a pre-stored satellite library.

14. The method of claim 11, wherein determining the azimuth angle of the user equipment based on the determined current location information associated with the user equipment comprises:

determining, by the processor, heading information associated with the user equipment using a pre-stored location library; and determining, by the processor, the azimuth angle of the user equipment based on the determined heading information.

15. The method of claim 11, wherein computing the threshold azimuth angle between the user equipment and the GEO satellite and the elevation angle of the user equipment based on the current location information associated with the user equipment and the determined satellite location comprises:

determining, by the processor, the latitude coordinates, and the longitude coordinates of the user equipment from a prestored location library;

computing, by the processor, a variable based on the determined latitude coordinates and the longitude coordinates of the user equipment; and determining, by the processor, the threshold azimuth angle of the user equipment based on a difference between the computed variable difference and 180° angle in a specific direction.

16. The method of claim 11, wherein determining the deviation level between the computed threshold azimuth angle and the determined azimuth angle of the user equipment comprises:

determining, by the processor, a difference between the computed threshold azimuth angle with the determined azimuth angle based on mapping; and determining, by the processor, the deviation level between the computed threshold azimuth angle and the determined azimuth angle of the user equipment based on the determined difference.

17. The method of claim 11, wherein generating the alignment recommendation message for the user equipment at real-time based on the determined deviation level comprises:

determining, by the processor, a target direction of the user equipment based on the determined deviation level;

generating, by the processor, a navigation path between the current location of the user equipment and the determined target direction of the user equipment; and generating, by the processor, the alignment recommendation message for the user equipment at real-time based on the generated navigation path, wherein the alignment recommendation message comprises at least one instruction to adjust a position and an angle of the user equipment closer to the computed threshold azimuth angle.

18. The method of claim 11, wherein validating the generated alignment recommendation message based on at least one of the signal strength, and the signal quality, associated with the user equipment comprises:

determining, by the processor, a satellite downlink reference signal received power (RSRP) value associated with the user equipment using a pre-stored signal library;

determining, by the processor, a satellite downlink signal strength level of the user equipment based on the determined satellite downlink RSRP value;

determining, by the processor, a reference signal received quality (RSRQ) value associated with the user equipment using the pre-stored signal library;

determining, by the processor, a signal quality level of the user equipment based on the determined RSRQ value;

comparing, by the processor, each of the determined signal strength level, and the signal quality level, of the user equipment with corresponding threshold signal strength level, and a threshold signal quality level of the user equipment; and validating, by the processor, the generated alignment recommendation message based on results of comparison, wherein the transmission of the emergency messages is initiated upon determining that the determined signal strength level, and the signal quality level, of the user equipment matches with the corresponding threshold signal strength level, and the threshold signal quality level, of the user equipment.

19. The method of claim 11, further comprising:

transmitting, by the processor, the emergency messages from the user equipment to the GEO satellite via the communication network.

20. A non-transitory computer-readable medium comprising machine-readable instructions that are executable by a processor to:

receive a request for transmitting at least one emergency message from a user equipment (UE) to a geosynchronous equatorial orbit (GEO) satellite;

determine current location information associated with the user equipment, wherein the current location information comprises latitude coordinates, longitude coordinates, and a heading information;

determine a satellite location associated with the geosynchronous equatorial orbit (GEO) satellite in proximity to the determined current location information associated with the user equipment;

compute a threshold azimuth angle between the user equipment and the GEO satellite and an elevation angle of the user equipment based on the current location information associated with the user equipment and the determined satellite location, wherein the elevation angle of the user equipment is computed based on a satellite height, a radius of earth, longitude coordinates of the GEO satellite, latitude coordinates, and the longitude coordinates of the user equipment;

determine an azimuth angle of the user equipment based on the determined current location information associated with the user equipment;

determine a deviation level between the computed threshold azimuth angle and the determined azimuth angle of the user equipment;

generate an alignment recommendation message for the user equipment at real-time based on the determined deviation level, wherein the generated alignment recommendation message comprises at least one action for navigating the user equipment to a specific location and a specific angle;

validate the generated alignment recommendation message based on at least one of a signal strength, and a signal quality associated with the user equipment; and dynamically initiate transmission of the at least one emergency message from the user equipment to the GEO satellite via a communication network.

* * * * *